(12) United States Patent
Nakamura et al.

(10) Patent No.: US 8,776,923 B2
(45) Date of Patent: Jul. 15, 2014

(54) AIR GUIDE STRUCTURE FOR SADDLE TYPE VEHICLE

(71) Applicant: Honda Motor Co., Ltd., Tokyo (JP)

(72) Inventors: Masanori Nakamura, Wako (JP); Hiroyuki Sasazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/798,256

(22) Filed: Mar. 13, 2013

(65) Prior Publication Data

US 2013/0249251 A1  Sep. 26, 2013

(30) Foreign Application Priority Data

Mar. 22, 2012 (JP) ................................ 2012-065054

(51) Int. Cl.
*B60K 11/06* (2006.01)

(52) U.S. Cl.
USPC ........................................ 180/68.1; 180/68.4

(58) Field of Classification Search
CPC ......... B60K 13/00; B60K 13/02; B60K 13/06
USPC .............................................. 180/68.1–68.4
See application file for complete search history.

(56) References Cited

U.S. PATENT DOCUMENTS

| | | | | |
|---|---|---|---|---|
| 4,640,341 | A | * | 2/1987 | Ozawa ............................ 165/41 |
| 5,577,570 | A | * | 11/1996 | Shiohara et al. ............... 180/219 |
| 7,484,767 | B2 | * | 2/2009 | Tsuya ............................ 280/835 |
| 8,181,729 | B2 | * | 5/2012 | Hiramatsu et al. ........... 180/68.3 |
| 2008/0236783 | A1 | * | 10/2008 | Morita et al. ................... 165/41 |
| 2009/0090576 | A1 | * | 4/2009 | Nishizawa et al. ........... 180/219 |
| 2010/0078242 | A1 | * | 4/2010 | Suzuki ......................... 180/68.6 |
| 2010/0243353 | A1 | * | 9/2010 | Inaoka et al. ................ 180/68.3 |
| 2013/0118822 | A1 | * | 5/2013 | Toda et al. ................... 180/68.4 |
| 2013/0313034 | A1 | * | 11/2013 | Matsushima et al. ......... 180/219 |

FOREIGN PATENT DOCUMENTS

JP  2008-213520  9/2008

* cited by examiner

*Primary Examiner* — Jeffrey J Restifo
*Assistant Examiner* — Erez Gurari
(74) *Attorney, Agent, or Firm* — Rankin, Hill & Clark LLP

(57) ABSTRACT

An air guide structure for a saddle type vehicle by which influence of exhaust air from a radiator on a fuel tank can be reduced effectively. A fuel tank is formed with a tank extension section extending to above the upper end of the radiator. A front wall of the tank extension section is inclined forward by obliquely extending rearwardly downward. A front lower cover disposed forwardly of the radiator and rearwardly of a front wheel is provided. The front lower cover is provided with a radiator opening section having a plurality of openings for guiding airflow to the radiator, and with a fuel tank opening section for guiding the airflow to the fuel tank inclusive of the tank extension section.

17 Claims, 24 Drawing Sheets

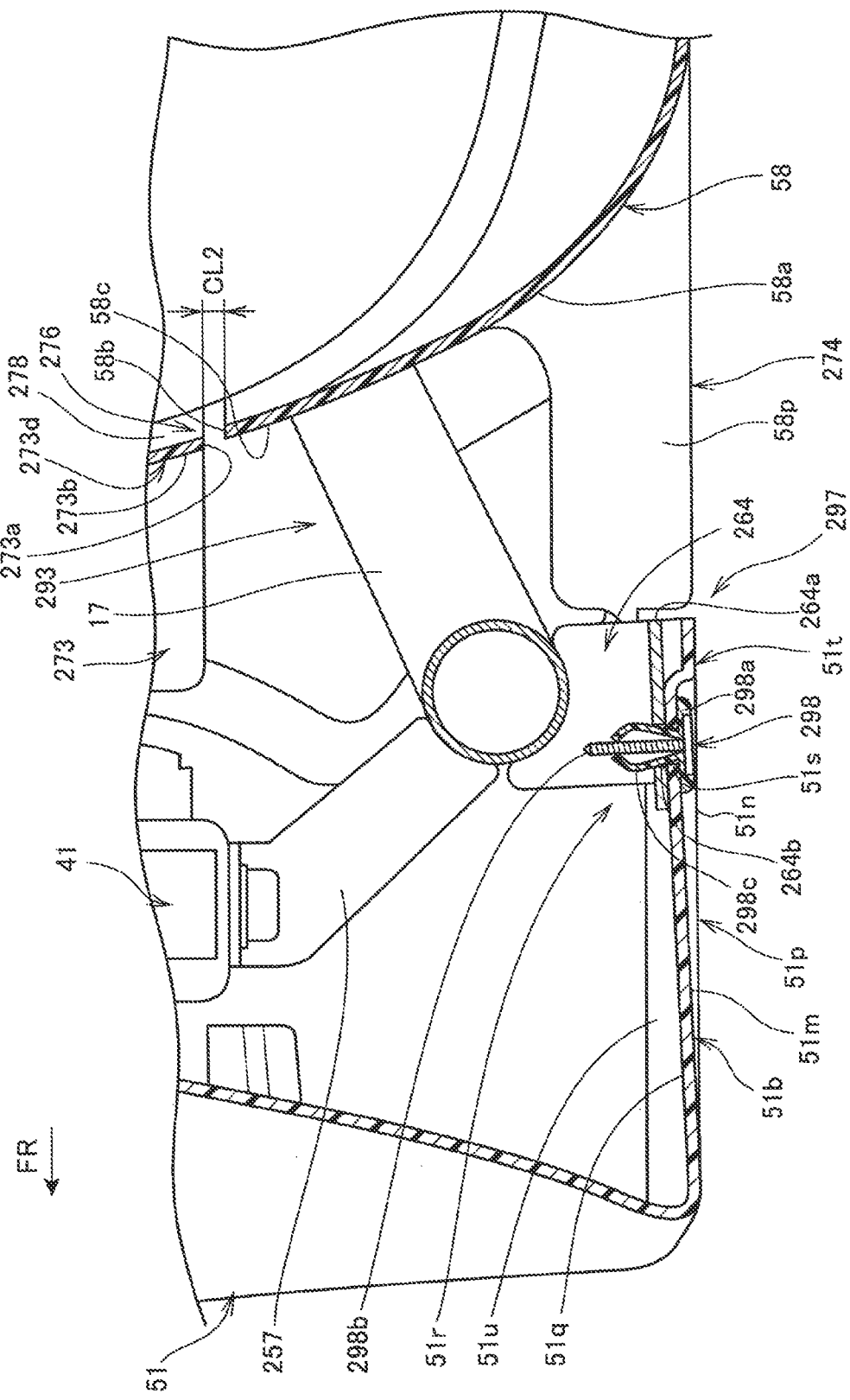

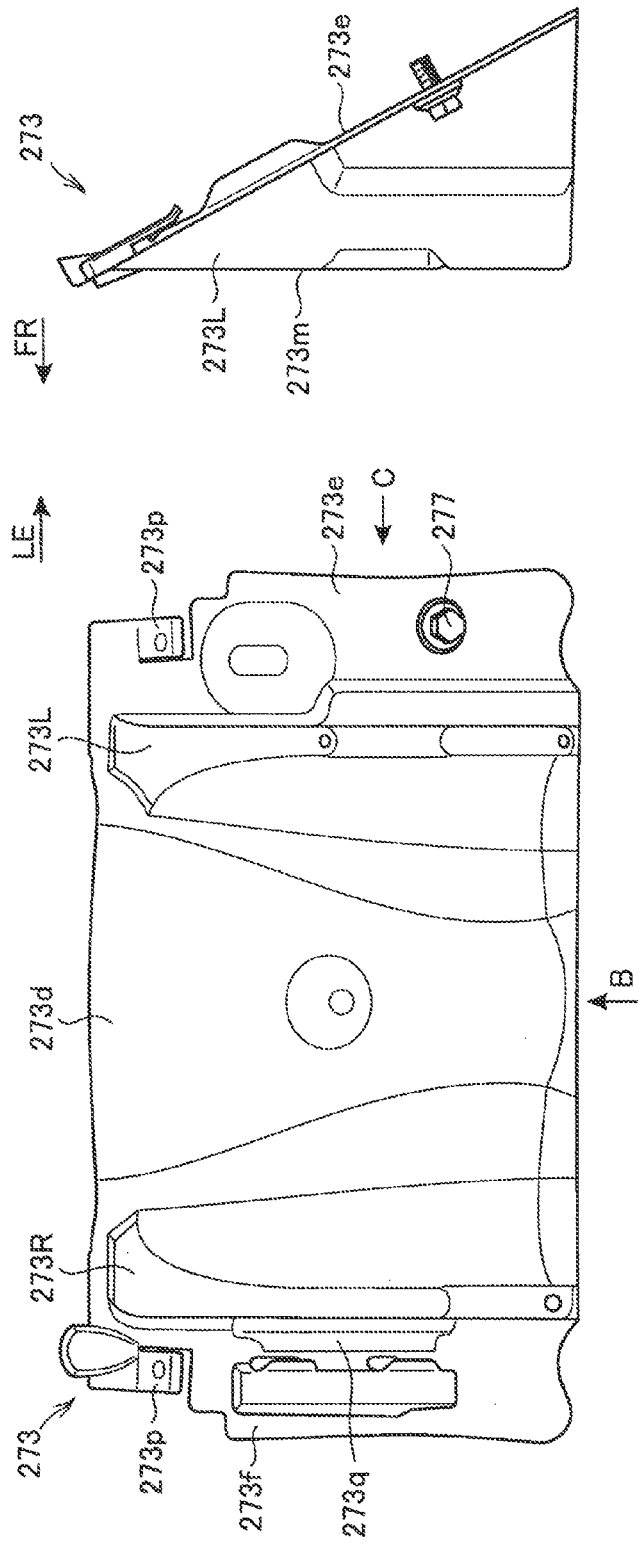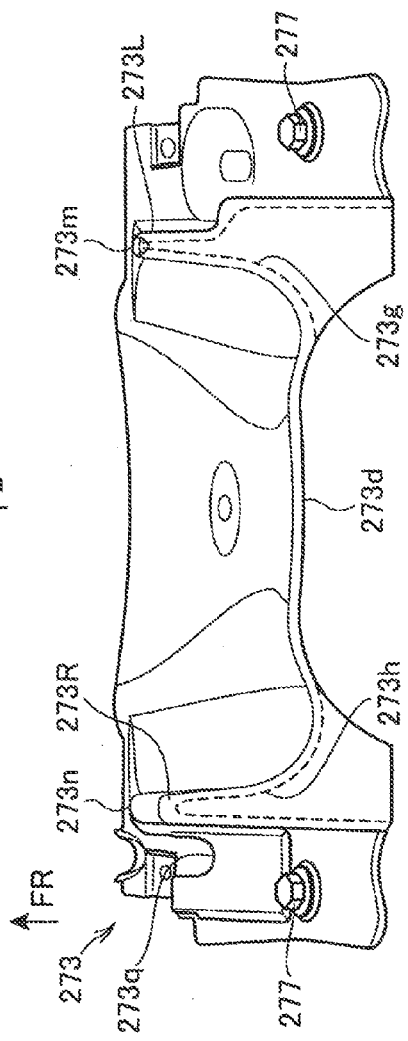

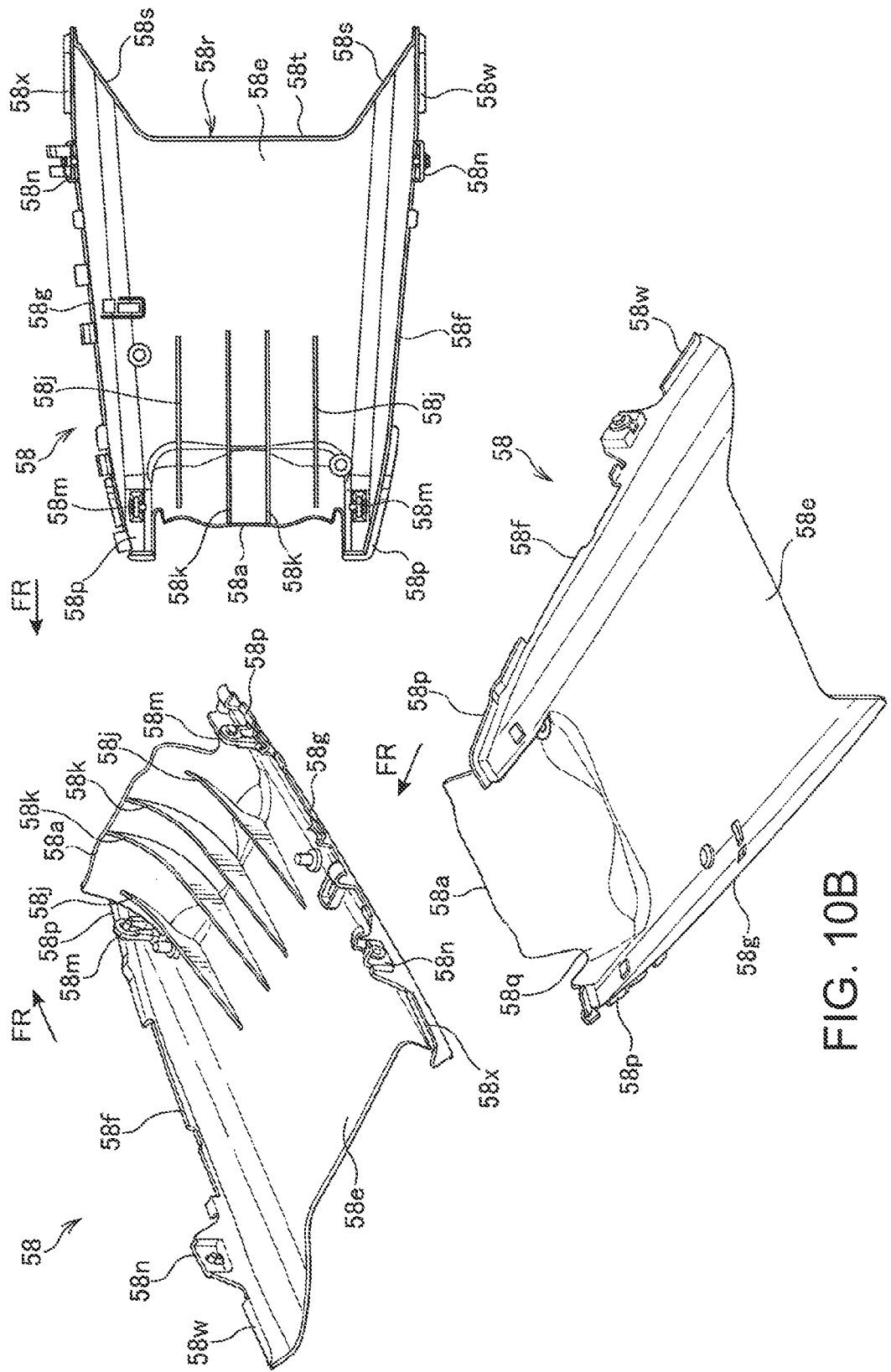

AIR GUIDE STRUCTURE FOR SADDLE TYPE VEHICLE

BACKGROUND OF THE INVENTION

1. Field of the Invention

The present invention relates to an air guide structure for a saddle type vehicle in which a fuel tank and a radiator located forwardly of the fuel tank are provided in a center tunnel provided between left and right step floors.

2. Description of Related Art

As a saddle type vehicle having a center tunnel under an area between a head pipe constituting a body frame and a seat and in which step floors are provided on vehicle-width-directionally both sides of the center tunnel, there has been known one wherein a fuel tank is disposed in the center tunnel and a radiator is disposed forwardly of the fuel tank (refer to, for example, Japanese Patent Laid-Open No. 2008-213520).

In Japanese Patent Laid-Open No. 2008-213520, the radiator is disposed forwardly of the fuel tank, so that exhaust air having passed across the radiator to cool the radiator is raised in temperature, and would influence the ambient temperature in the periphery of the fuel tank. In view of this, it may be contemplated to take a countermeasure such as providing a heat insulating plate between the fuel tank and the radiator. In this case, a structure for reducing more effectively the influence of exhaust air from the radiator on the fuel tank is demanded.

SUMMARY OF THE INVENTION

The present invention has been made in consideration of the above-mentioned circumstances. Accordingly, it is an object of the present invention to provide an air guide structure for a saddle type vehicle by which it is possible to reduce more effectively the influence of exhaust air from a radiator on a fuel tank.

In order to solve the above-mentioned problem, according to the present invention, there is provided an air guide structure for a saddle type vehicle including a head pipe turnably supporting a steering system and constituting a front portion of a body frame, a seat disposed rearwardly of the head pipe, a center tunnel provided between the head pipe and the seat, step floors provided on the left and right sides of the center tunnel, a fuel tank disposed in the center tunnel, and a radiator disposed forwardly of the fuel tank in the center tunnel, wherein the fuel tank is provided with a tank extension section that extends to above an upper end of the radiator, a front wall of the tank extension section is inclined forward by obliquely extending rearwardly downward, a front lower cover is disposed forwardly of the radiator and rearwardly of a front wheel, and the front lower cover is provided with a radiator opening section for guiding airflow (attendant on the traveling of the vehicle) to the radiator and with a fuel tank opening section for guiding the airflow to the fuel tank inclusive of the tank extension section.

According to this configuration, the front lower cover is provided with the fuel tank opening section separately from the radiator opening section. This ensures that the airflow can be guided to the fuel tank via the fuel tank opening section, and that fresh air other than the radiator exhaust air can be guided to an area between the radiator and the fuel tank by utilizing the front wall of the tank extension section. Therefore, the influence of the exhaust air from the radiator on the fuel tank can be reduced more effectively.

In addition, in the above-mentioned configuration, a configuration may be adopted wherein a heat insulation guide that covers a part of the front wall of the fuel tank to avoid thermal influence of the exhaust air from the radiator is provided between the fuel tank and the radiator, and a predetermined clearance is provided between the heat insulation guide and the fuel tank over a range from an upper end to a lower end of the heat insulation guide. According to this configuration, not only the front wall of the fuel tank is covered but also the predetermined clearance is provided between the heat insulation guide and the fuel tank. This ensures that the airflow introduced via the front lower cover is guided into an area between the heat insulation guide and the fuel tank, whereby a heat-insulating effect can be enhanced and thermal influence on the fuel tank can be reduced further.

Besides, in the above-mentioned configuration, the upper end of the heat insulation guide may be disposed below the upper end of the radiator and above a vertical-directionally central position of the radiator. This configuration is advantageous as follows. If, for example, the heat insulation guide is disposed above the upper end of the radiator, the clearance between the radiator and the fuel tank must be enlarged, since the front wall of the fuel tank is inclined forward. According to the just-mentioned configuration, on the other hand, the upper end of the heat insulation guide is disposed below the upper end of the radiator, so that the spacing between the radiator and the fuel tank can be reduced. Consequently, the vehicle can be made compact in its longitudinal direction (front-rear direction).

In addition, since the upper end of the heat insulation guide is disposed below the upper end of the radiator, the exhaust air from the radiator may be considered to enter the area between the heat insulation guide and the fuel tank via the upper end of the heat insulation guide. Since the upper end of the heat insulation guide is provided above the vertical-directionally central position of the radiator, however, fresh air (other than the exhaust air from the radiator) introduced via the gap between the radiator upper end and the fuel tank can restrain the radiator exhaust air from being introduced into the area between the heat insulation guide and the fuel tank by way of the heat insulation guide upper end. As a result, the influence of the exhaust air from the radiator can be minimized.

Further, with the upper end of the heat insulation guide disposed below the upper end of the radiator, the clearance between the radiator upper end and the fuel tank can be reduced. This contributes to realization of a more compact vehicle. Moreover, this configuration ensures that the flow velocity of the fresh air passing through the clearance between the radiator upper end and the fuel tank can be enhanced, so that the fresh air can be easily introduced into the clearance between the heat insulation guide and the fuel tank.

Besides, in the above-mentioned configuration, the heat insulation guide may be provided with longitudinal fin parts projecting forward, on vehicle-width-directionally both sides, so as to restrain exhaust air from the radiator from flowing to vehicle-width-directionally outer sides of the longitudinal fin parts. This configuration makes it possible to collect the radiator exhaust air to the vehicle-width-directionally inner side of the longitudinal fin parts, and to suppress more effectively the thermal influence of the radiator exhaust air on the fuel tank.

In addition, in the above-mentioned configuration, a configuration may be adopted wherein the fuel tank is covered with an under cover on the lower side thereof, the under cover is provided with an air guide wall extending toward the radiator side, and an upper end of the air guide wall and a lower end of the heat insulation guide are disposed proximate to each other in the vertical direction (height direction). According to this configuration, the upper end of the air guide wall and the lower end of the heat insulation guide are disposed proximate to each other. This ensures that a radiator exhaust air passage with a large area can be formed by the air guide wall and the heat insulation guide, while restraining water or the like from entering via the gap between the air guide wall and the heat insulation guide. The air guide wall and the heat insulation guide cooperate with each other to cause the radiator exhaust air to flow down from the rear side of the radiator along the heat insulation guide and the front surface of the air guide wall, so that the radiator exhaust air is discharged to the lower side of the under cover. In addition, fresh air can be guided along back surfaces of the heat insulation guide and the air guide wall to flow to the lower surface side of the fuel tank. Thus, the air introduced can be distributed to front and rear two layers of flow, with the heat insulation guide and the air guide wall as a boundary. In the one-side layer of flow, exhaust of the radiator exhaust air is conducted, while heat insulation by the fresh air is conducted in the other-side layer of flow. By both of these functions, it is made possible to reduce more effectively the thermal influence on the fuel tank.

Besides, in the above-mentioned configuration, the upper end of the air guide wall and the lower end of the heat insulation guide may be disposed with a predetermined clearance therebetween. This configuration ensures that the air guide wall and the heat insulation guide define the predetermined clearance therebetween and are therefore not connected with each other, although they are disposed proximate to each other. Therefore, a step of assembling the air guide wall and the heat insulation guide in the inside of the body cover can be abolished, and productivity can be enhanced thereby.

In addition, in the above-mentioned configuration, a configuration may be adopted wherein under side covers are provided on vehicle-width-directionally both sides of the under cover, and the outside ends of the under cover and the inside ends of the under side covers are disposed separate from each other. This configuration ensures that the fresh air guided into an area between the under cover and the lower surface of the fuel tank can be discharged via clearances between the under cover and the under side covers, so that a flow rate of the fresh air can be secured. Consequently, the thermal influence on the fuel tank can be reduced more effectively.

Besides, in the above-mentioned configuration, the outside ends of the under cover and the inside ends of the under side covers may be so disposed as to overlap with each other in plan view. According to this configuration, it is possible to lower the possibility of a situation wherein water and the like splashed from the front wheel might enter the inside of the under cover and the under side covers from the lower side of the vehicle body, since the outside ends of the under cover and the inside ends of the under side covers are spaced apart in the vertical direction.

According to the present invention, the fuel tank is formed with the tank extension section extending upward to above the upper end of the radiator, and the front wall of the tank extension section is inclined forward by obliquely extending rearwardly downward. Besides, the front lower cover is disposed forwardly of the radiator and rearwardly of the front wheel, and the front lower cover is provided with the radiator opening section for guiding airflow to the radiator and with the fuel tank opening section for guiding the airflow to the fuel tank inclusive of the tank extension section. Since the front lower cover is provided with the fuel tank opening section separately from the radiator opening, it is made possible to introduce the airflow to the fuel tank via the fuel tank opening section, and to guide fresh air (other than the radiator exhaust air) into the area between the radiator and the fuel tank through utilizing the front wall of the tank extension section. Therefore, the influence of the radiator exhaust air on the fuel tank can be reduced further effectively.

In addition, the heat insulation guide, which covers a part of the front wall of the fuel tank to avoid thermal influence of the radiator exhaust air, is provided between the fuel tank and the radiator, and the predetermined clearance is provided between the heat insulation guide and the fuel tank over the range from the upper end to the lower end of the heat insulation guide. Thus, not only the front wall of the fuel tank is covered but also the predetermined clearance is provided between the heat insulation guide and the fuel tank. This ensures that the airflow introduced via the front lower cover is guided into the area between the heat insulation guide and the fuel tank, whereby a heat-insulating effect can be enhanced and thermal influence on the fuel tank can be further reduced.

Besides, the upper end of the heat insulation guide is disposed below the upper end of the radiator and above the vertical-directionally central position of the radiator, which is advantageous as follows. If, for example, the heat insulation guide is disposed above the upper end of the radiator, the clearance between the radiator and the fuel tank must be enlarged because the front wall of the fuel tank is inclined forward. When the upper end of the heat insulation guide is disposed below the upper end of the radiator, on the other hand, the spacing between the radiator and the fuel tank can be reduced. This permits the vehicle to be compacter in its longitudinal direction.

Since the upper end of the heat insulation guide is disposed below the upper end of the radiator, exhaust air from the radiator may be considered to enter into the gap between the heat insulation guide and the fuel tank by way of the upper end of the heat insulation guide. Since the upper end of the heat insulation guide is provided above the vertical-directionally central position of the radiator, however, fresh air (other than the exhaust air from the radiator) introduced via the spacing between the radiator upper end and the fuel tank can restrain the radiator exhaust air from being introduced into the gap between the heat insulation guide and the fuel tank by way of the upper end of the heat insulation guide. Therefore, the influence of the exhaust air from the radiator can be minimized.

Further, arrangement of the upper end of the heat insulation guide below the upper end of the radiator makes it possible to reduce the clearance between the radiator upper end and the fuel tank, which contributes to realization of a more compact vehicle. In addition, this configuration makes it possible to enhance the flow velocity of the fresh air passing through the clearance between the radiator upper end and the fuel tank. Consequently, the fresh air can be easily guided into the clearance between the heat insulation guide and the fuel tank.

Besides, the heat insulation guide is provided with the longitudinal fin parts projecting forward, on vehicle-width-directionally both sides, so as to restrain the radiator exhaust air from flowing to the vehicle-width-directionally outer sides of the longitudinal fin parts. Therefore, the radiator exhaust air can be collected to the vehicle-width-directionally inner side of the longitudinal fin parts, and the thermal influence of the radiator exhaust air on the fuel tank can be suppressed more effectively.

In addition, the lower side of the fuel tank is covered with the under cover, the under cover is provided with the air guide wall extending toward the radiator side, and the upper end of the air guide wall and the lower end of the heat insulation guide are disposed proximate to each other in the vertical direction. This configuration ensures that a radiator exhaust air passage with a large area can be formed by the air guide wall and the heat insulation guide, while restraining water and the like from entering via the gap between the air guide wall and the heat insulation guide. The air guide wall and the heat insulation guide cooperate with each other to cause the radiator exhaust air to flow down from the rear side of the radiator along the heat insulation guide and the front surface of the air guide wall, to be discharged to the lower side of the under cover. In addition, fresh air can be guided along back surfaces of the heat insulation guide and the air guide wall to flow to the lower surface side of the fuel tank. Thus, the air introduced can be distributed to front and rear two layers of flow, with the heat insulation guide and the air guide wall as a boundary. In the one-side layer of flow, exhaust of the radiator exhaust air is conducted, while heat insulation by the fresh air is conducted in the other-side layer of flow. By both of these functions, it is made possible to reduce more effectively the thermal influence on the fuel tank.

Besides, since the upper end of the air guide wall and the lower end of the heat insulation guide are disposed with the predetermined clearance therebetween, the air guide wall and the heat insulation guide define the predetermined clearance therebetween and are therefore not interconnected, although they are disposed proximate to each other. This makes it possible to abolish a step of assembling the air guide wall and the heat insulation guide in the inside of the body cover, and thereby to enhance productivity.

In addition, the under side covers are provided on vehicle-width-directionally both sides of the under cover, and the outside ends of the under cover and the inside ends of the under side covers are disposed apart from each other. This ensures that the fresh air guided by the air guide wall into the area between the under cover and the fuel tank lower surface can be discharged via the clearances between the under cover and the under side covers. Since a flow rate of the fresh air is thus secured, thermal influence on the fuel tank can be reduced more effectively.

Besides, the outside ends of the under cover and the inside ends of the under side covers are disposed to overlap with each other. This makes it possible to lower the possibility of a situation in which water and the like splashed by the front wheel might enter the inside of the under cover and the under side covers from the lower side of the vehicle body, since the outside ends of the under cover and the inside ends of the under side covers are spaced apart in the vertical direction.

BRIEF DESCRIPTION OF THE DRAWINGS

FIG. 8 is an essential part sectional view showing a front lower portion of the motorcycle.

FIGS. 9A-C show illustrations of an air exhaust guide.

FIGS. 10A-C show illustrations of an under cover.

DETAILED DESCRIPTION OF THE PREFERRED EMBODIMENTS

Figure 1:
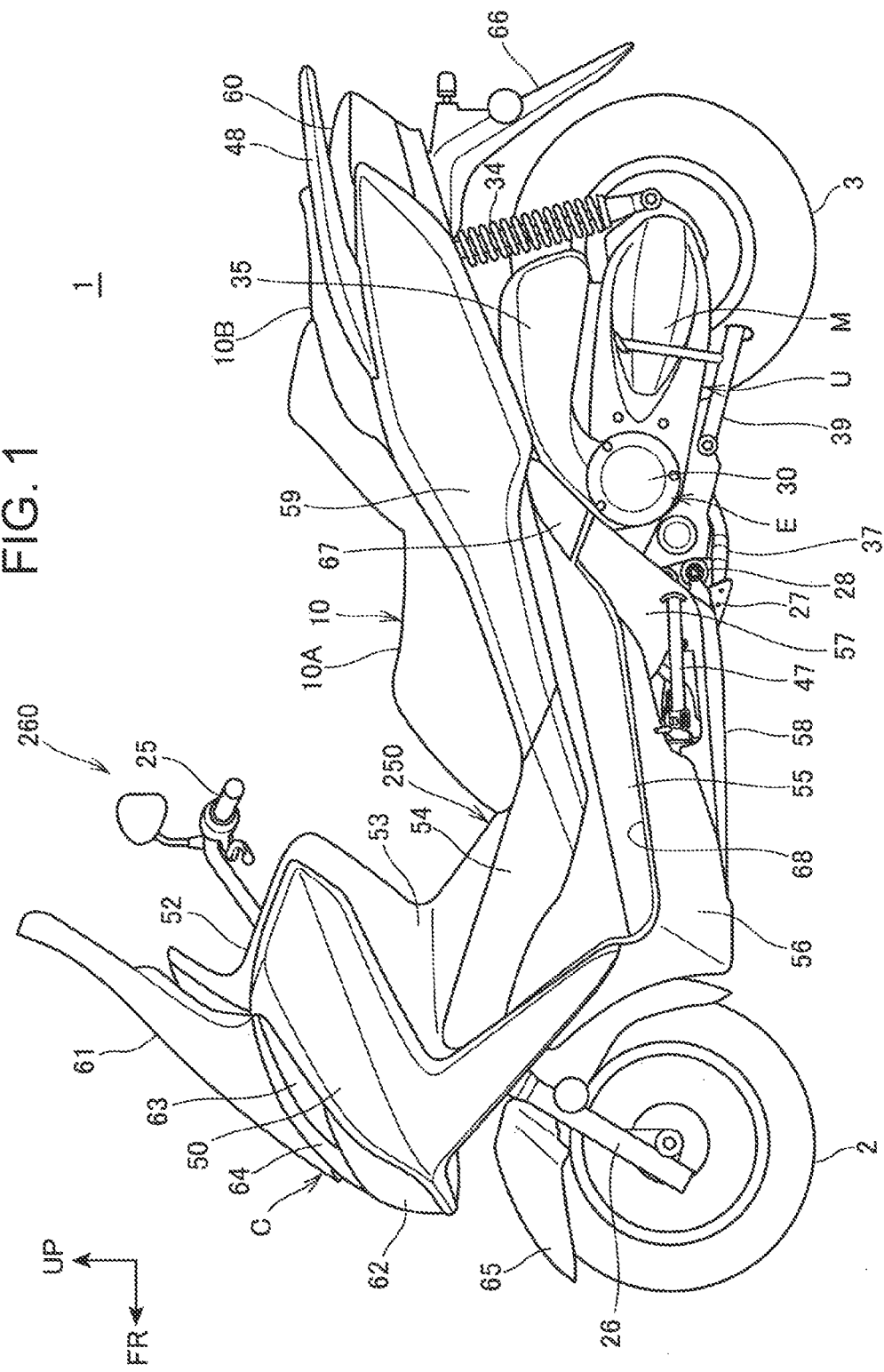
FIG. 1 is a left side view of a motorcycle according to an embodiment of the present invention.

Now, an embodiment of the present invention will be described below, referring to the drawings. Incidentally, in the following, such directions as the forward, rearward, leftward, rightward, upward and downward directions will be the same as those with respect to the vehicle body, unless otherwise specified. In addition, reference sign FR shown in the drawings indicates the front side of the vehicle body, reference sign UP the upper side of the vehicle body, and reference sign LE the left side of the vehicle body.

FIG. 1 is a left side view of a motorcycle 1 according to this embodiment of the present invention.

The motorcycle 1 (saddle type vehicle) is a motor scooter type vehicle having left and right low-floor step floors 68 on which to put the feet of the rider seated on a seat 10. A front wheel 2 is provided forwardly of a body frame F (see FIG. 2), and a rear wheel 3 as a driving wheel is supported through an axle on a unit swing engine U (unit swing power unit) disposed at a rear portion of the vehicle. The body frame F is covered with a resin-made body cover C.

Figure 2:
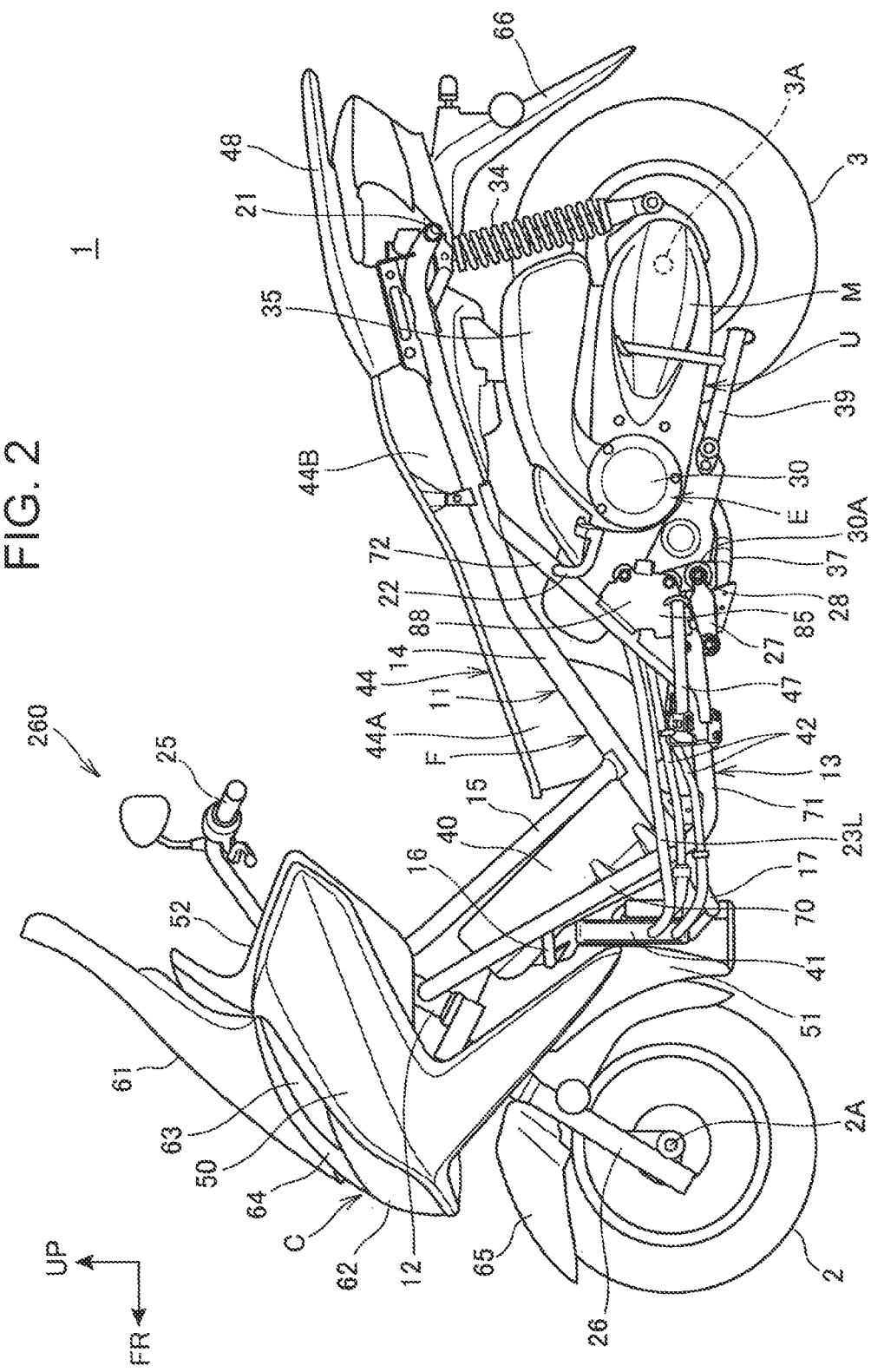
FIG. 2 is a left side view showing the internal structure of the motorcycle.
Figure 3:
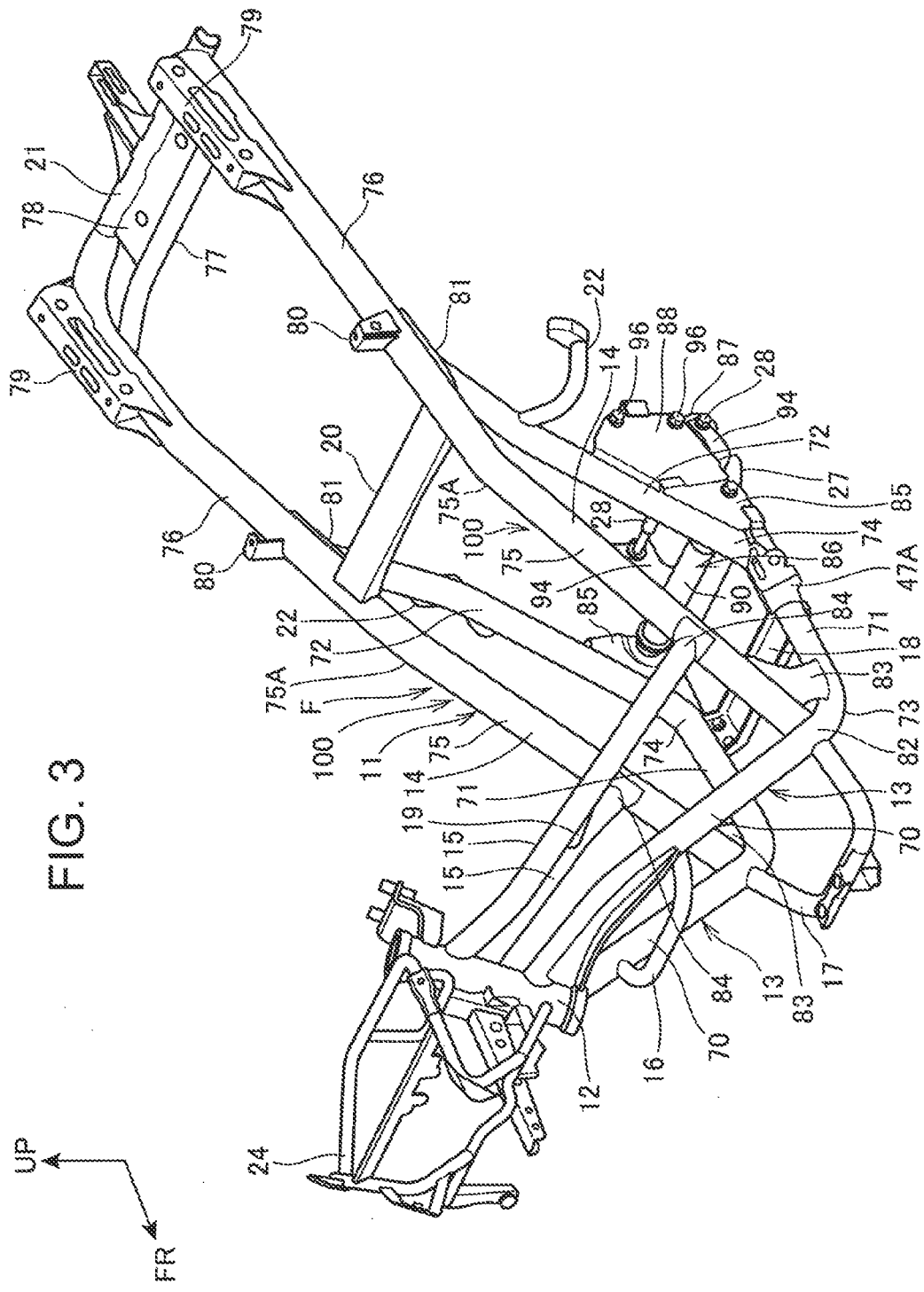
FIG. 3 is a perspective view of a body frame.

FIG. 2 is a left side view showing the internal structure of the motorcycle 1, and FIG. 3 is a perspective view of the body frame F. Here, in FIG. 2, a state wherein a part of the body cover C has been removed is shown.

As shown in FIGS. 2 and 3, the body frame F has a plurality of metallic tubes and pipes interconnected by welding. A main frame 11 includes: a head pipe 12 provided at a front portion of the main frame 11; left and right down tubes 13, 13 extending rearwardly downward from the head pipe 12, then extending rearward roughly horizontally, and extending rearwardly upward at rear portions thereof; left and right seat rails 14, 14 extending rearwardly upward from lower portions of the down tubes 13, 13 to vehicle body rear portions; and left and right upper tubes 15, 15 extending rearwardly downward over the down tubes 13, 13 from the head pipe 12 and connected to the seat rails 14, 14.

The down tubes 13, 13 each include a downward extension section 70 connected to the head pipe 12 at its front end and extending rearwardly downward, a horizontal extension section 71 extending roughly horizontally rearward from the lower end of the downward extension section 70, and an oblique upward extension section 72 extending rearwardly upward from the rear end of the horizontal extension section 71.

As shown in FIG. 3, the main frame 11 is provided with cross members that interconnect the left and right frames. The cross members include: a front upper cross member 16 which interconnects upper portions of the downward extension sections 70, 70 of the down tubes 13, 13; a front cross member 17 that interconnects lower portions of the downward extension sections 70, 70; a horizontal section cross member 18 that interconnects the horizontal extension sections 71, 71 of the down tubes 13, 13; an upper cross member 19 that interconnects the upper tubes 15, 15; an intermediate cross member 20 that interconnects the seat rails 14, 14; and a rear cross member 21 that interconnects rear portions of the seat rails 14, 14. The horizontal section cross member 18 is connected to the horizontal extension sections 71, 71 by bolting.

Left and right tandem step stays 22, 22 extending toward vehicle-width-directionally outer sides are provided at upper portions of the oblique upward extension sections 72, 72 of the down tubes 13, 13.

A cage-like front frame 24, which supports lights, the body cover C and the like, is connected to a front surface of the head pipe 12.

Figure 14:
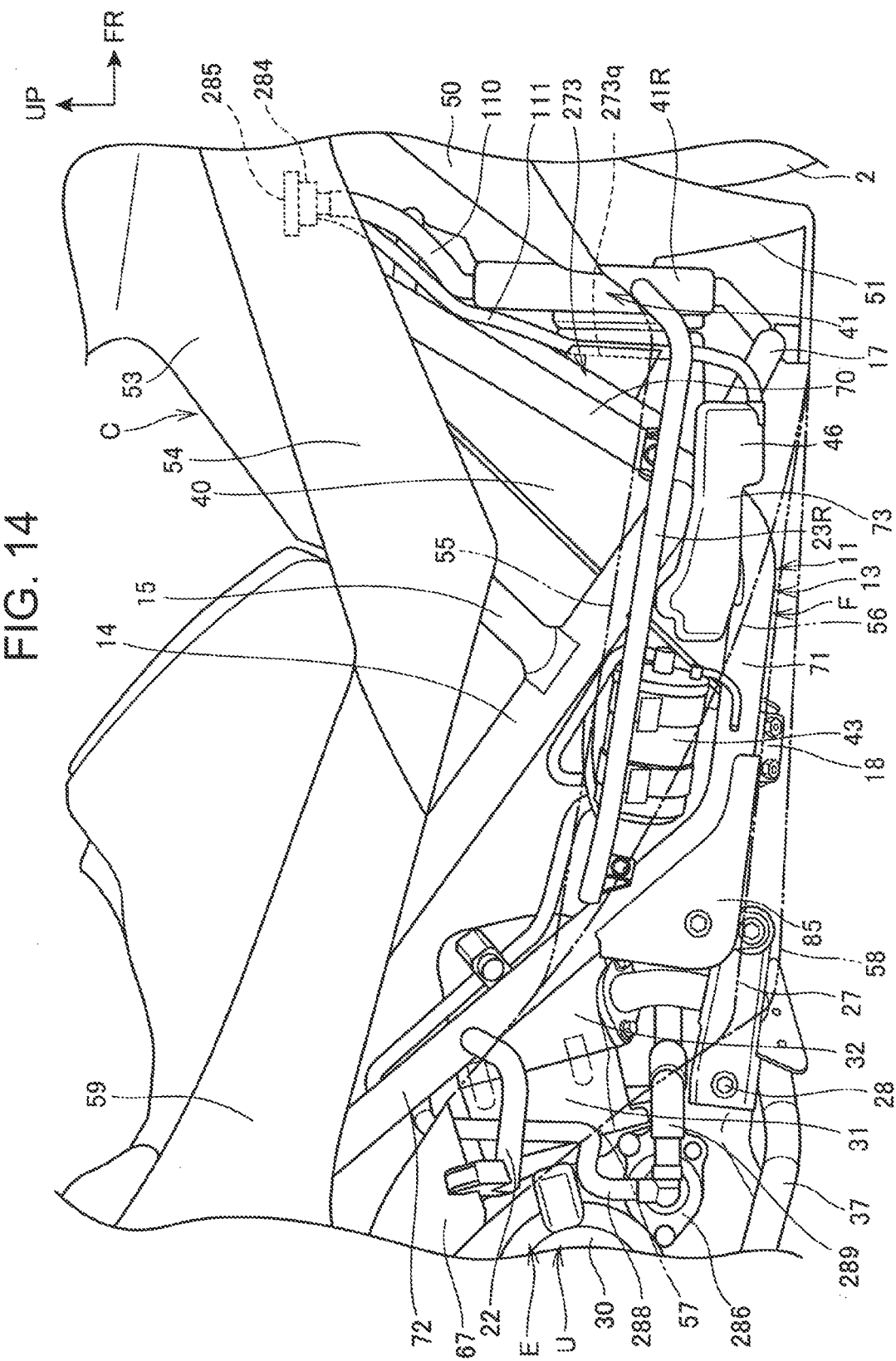
FIG. 14 is an essential part right side view of the motorcycle from which a part of the body cover has been removed.

Besides, left and right step frames 23L, 23R (reference sign 23L is shown in FIG. 2, while reference sign 23R is shown in FIG. 14), which are connected to the down tubes 13, 13 and extend in the front-rear direction (vehicle longitudinal direction) so as to support the step floors 68 from below, are provided on the lateral outer sides of the main frame 11.

As shown in FIGS. 1 and 2, a steering system 260 for steering the front wheel 2 includes a steering shaft (not shown) turnably supported on the head pipe 12, and a handle-bar 25 connected to an upper portion of the steering shaft. The lower end of the steering shaft is connected to left and right front forks 26, 26, the front wheel 2 is rotatably supported on the lower ends of the front forks 26, 26 through an axle 2A, and is steered by an operation of the handlebar 25.

The unit swing engine U is of a unit swing type in which an engine E and a transmission case 51 with a belt-type continuously variable transmission (not shown) housed therein are united together. The unit swing engine U functions also as a swing arm for supporting the rear wheel 3. The unit swing engine U is connected to rear portions of the down tubes 13, 13 through link members 27 connected to its front portions, and is vertically swingable about a pivot 28 provided on the link members 27.

The engine E is a water-cooled four-cycle single-cylinder engine, and is so disposed that a cylinder axis thereof extends forward, roughly horizontally. The engine E has a configuration in which a cylinder 31 (see FIG. 14) and a cylinder head 33 (see FIG. 14) are connected to a front surface of a crankcase 30 disposed at a front portion of the unit swing engine U (unit swing power unit).

The transmission case M extends rearward from a rear portion of the crankcase 30 and on the left side of the rear wheel 3. An arm section extending rearward on the right side of the rear wheel 3 is provided at a rear portion of the crankcase 30. The rear wheel 3 is supported on an axle 3A provided between a rear portion of the transmission case M and a rear portion of the arm section. An output of the engine E is transmitted to the rear wheel 3 through the continuously variable transmission.

Left and right rear suspensions 34, 34 (only reference sign 34 on the viewer's side is shown) are arranged between the rear end of the transmission case M as well as the rear end of the arm section and the seat rails 14, 14.

At an upper surface of the transmission case M, an air cleaner box 35 for sucking the outside air is provided. The air cleaner box 35 is connected to a throttle body, which is connected to an intake port at an upper surface of the cylinder head 32, through a connecting tube (not shown).

An exhaust pipe 37 connected to an exhaust port at a lower surface of the cylinder head 32 extends rearward on the lower side of the engine E, and is connected to a muffler 38 (see FIG. 11) fixed to an outside surface of the arm section. A main stand 39 by which the vehicle can be supported in an upright state is provided at a lower portion of a rear part of the transmission case M.

A fuel tank 40 for holding fuel for the engine E is formed to have its front surface along the downward extension sections 70 of the down tubes 13 and have its rear surface along the upper tubes 15, in side view. In the vertical direction, the fuel tank 40 extends long vertically from the rear side of a lower portion of the head pipe 12 to the vicinity of the horizontal extension sections 71 of the down tubes 13. The fuel tank 40 is disposed in a forwardly inclined state between the left and right down tubes 13, 13.

In a space under a front portion of the fuel tank 40 thus inclined forwardly, a plate-like radiator 41, which cools cooling water for the engine E, is provided. A pair of cooling water pipes 42 for interconnecting the radiator 41 and the engine E extend from a left side portion of the radiator 41, extend rearward on the lower side of the step frame 23L on the left side (one side) of the vehicle, and pass on the inner side of the down tube 13, to be connected to the engine E. A side stand 47 is attached to the horizontal extension section 71 on the left side.

A reservoir tank 46 (see FIG. 14) for holding a portion of the cooling water relevant to the radiator 41 is disposed under the step frame 23R (see FIG. 14) on the right side of the vehicle, on the rear side of the radiator 41. In addition, a canister 43 (see FIG. 14) for adsorption of an evaporated fuel in the fuel tank 40 is provided under the step frame 23R on the rear side of the reservoir tank 46.

A storage box 44 is disposed between the seat rails 14, 14, and extends rearwardly upward along the seat rails 14, 14 from the vicinity of a rear portion of the fuel tank 40 to the upper side of the transmission case M. The storage box 44 has a configuration wherein a front storage section 44A disposed between the fuel tank 40 and the upward extension sections 72 of the down tubes 13, and a rear storage section 44B disposed on the upper side of the unit swing engine U are integrally formed by resin molding.

The storage box 44 is opening on the upper side over the overall length thereof, and the opening is openably closed with the rider seat 10 (see FIG. 1). The seat 10 has a front seat 10A on which to seat the rider, and a rear seat 10B which is formed to be a little higher than the front seat 10A and on which to seat the pillion passenger.

A passenger grip 48 is fixed to rear portions of the seat rails 14, 14 on the rear side of the storage box 44.

As shown in FIGS. 1 and 3, the body cover C includes: a front cover 50 that covers the front side and the left and right sides of the head pipe 12 and extends downward on the front side of the downward extension section 70; a front lower cover 51 (FIGS. 2 and 3) connected to a lower portion of the front cover 50 and located rearwardly of the front wheel 2; an upper cover 52 connected to an upper portion of the front cover 50 on the lower side of the handlebar 25; an upper inner cover 53 that is connected to left and right edge portions of the front cover 50 and by which the head pipe 12, the upper tubes 15, 15 and the downward extension sections 70 are covered on the rear side and lateral sides thereof; left and right lower inner covers 54, 54 that are connected to the lower edge of the upper inner cover 50 and by which the upper tubes 15, 15 and the downward extension sections 70 are covered; left and right step covers 55, 55 that are connected to a lower portion of the front cover 50 and the lower edges of the lower inner covers 54, 54, and by which the left and right step frames 23L, 23R are covered on the upper side thereof; left and right front floor skirts 56, 56 that are connected to a lower portion of the front cover 50 and lower portions of the step covers 55, 55, and by which the step frames 23L, 23R are covered on lateral sides thereof; left and right rear floor skirts 57, 57 that extend rearward in continuity with the front floor skirts 56, 56 and that cover the down tubes 13, 13; an under cover 58 by which the left and right horizontal extension section 71, 71 are covered on the lower side thereof; left and right body side covers 59, 59 that are connected to the lower inner covers 54, 54 and rear portions of the step covers 55, 55 and by which the storage box 44 and the seat rails 14, 14 are covered on lateral sides thereof under the seat 10; and a tail cover 60 connected to rear portions of the body side covers 59, 59.

The left and right step floors 68 that receive the feet of the driver seated on the front seat 10A are formed at bottom portions of the left and right step covers 55, 55.

The upper inner cover 53, the lower inner covers 54, 54 and the step covers 55, 55 are component parts constituting the center tunnel 250 disposed on the lower side between the handlebar 25 and the seat 10.

At a front portion of the front cover 50, a windscreen 61 extending rearwardly upward is provided. A headlamp 62 is provided at the front end of the front cover 50, and left and right turn signal lamps 63 are provided in continuity with an upper portion of the headlamp 62. A plate-shaped garnish 64 is provided between the headlamp 62 and the windscreen 61.

A front fender 65 by which the front wheel 2 is covered on the upper side thereof is provided on the front forks 26, 26. A rear fender 66 by which the rear wheel 3 is covered on the upper side thereof is provided under the body side covers 59, 59.

Tiltable-type tandem steps 67 (see FIG. 1) that receive the feet of the pillion passenger seated on the rear seat 10B are supported by the tandem step stays 22, 22.

Now, the frame structure of the motorcycle 1 will be described in detail below.

Figure 4:
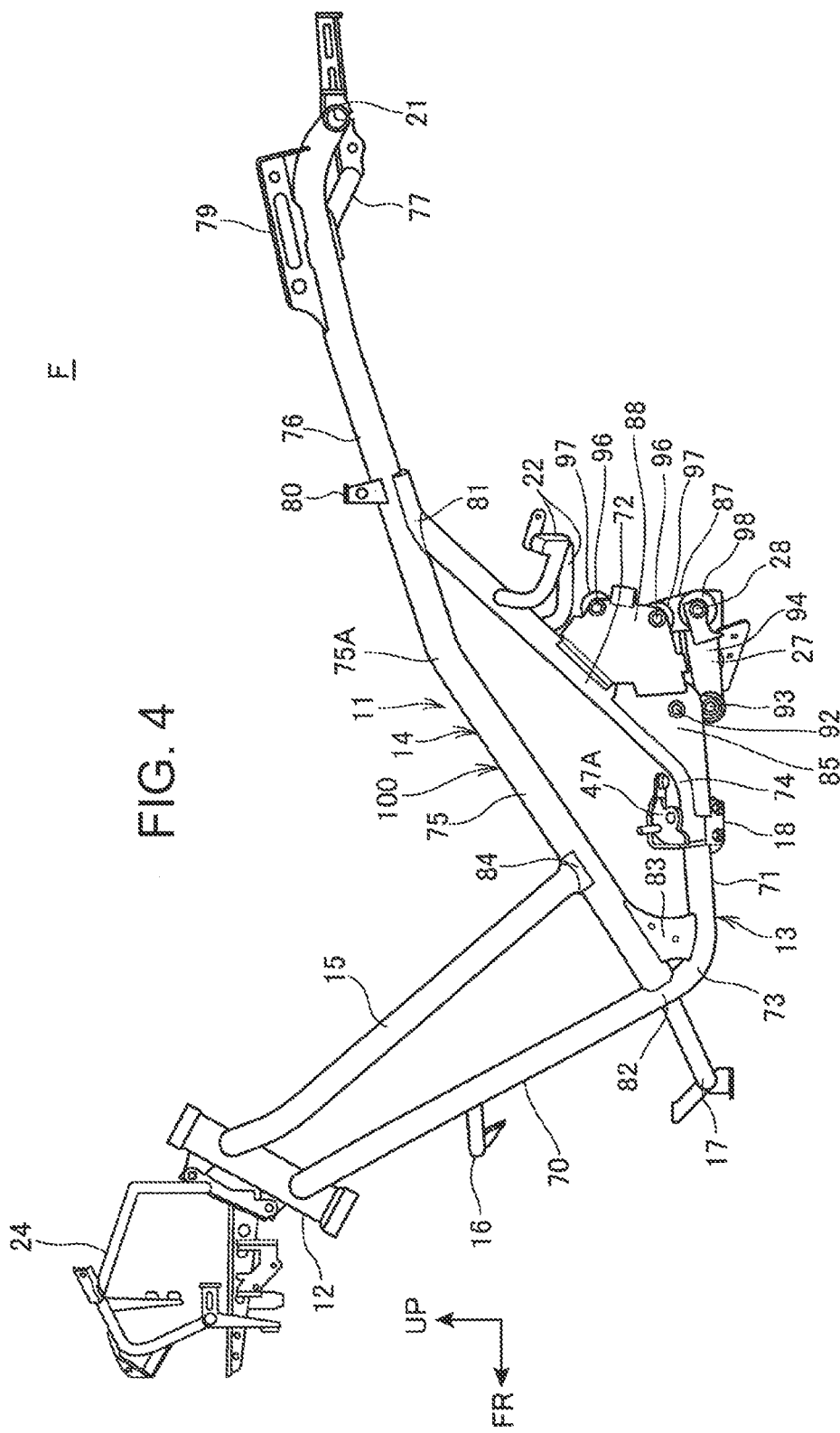
FIG. 4 is a left side view of the body frame.

As shown in FIGS. 3 and 4, each of the down tubes 13, 13 includes: the downward extension section 70 connected at its front end to a lower portion of the head pipe 12; a first bent section 73 bent rearward at the lower end of the downward extension section 70; the horizontal extension section 71 extending rearward from the first bent section 73; a second bent section 74 formed at the rear end of the horizontal extension section 71 and bent rearwardly upward; and the oblique upward extension section 72 extending rearwardly upward from the second bent section 74 and connected at its rear end to the seat rail 14. Each of the down tubes 13, 13 is formed by bending a single continuous metallic tube at the first bent section 73 and the second bent section 74 by a bender. The spacing between the left and right down tubes 13, 13 is increased along the rearward direction.

Left and right power unit support sections 85, 85 for supporting the unit swing engine U through the link members 27 are formed rearwardly of the second bent sections 74.

A stand stay 47A to which the side stand 47 is attached is mounted to the horizontal extension section 71 on the left side, at a position on a lateral side of the horizontal cross member 18.

The seat rails 14, 14 include: seat rail front sections 75 which are connected at their front ends to rear surfaces of lower portions of the downward extension sections 70 of the down tubes 13, 13 and extend rearwardly upward, and connected at their rear ends to the rear ends of the oblique upward extension sections 72; and seat rail rear sections 76 extend from the rear ends of the seat rail front sections 75 to rear portions of the vehicle. The spacing between the left and right seat rails 14, 14 is increased along the rearward direction.

A rear second cross member 77 for interconnecting the seat rails 14, 14 is provided forwardly of the rear cross member 21 between the seat rail rear sections 76. The rear second cross member 77 and the rear cross member 21 are interconnected by a reinforcement plate 78 extending in the front-rear direction. In addition, a passenger grip stay 79 to which the passenger grip 48 is connected is provided on an upper surface of each seat rail rear section 76, whereas a box stay 80 to which the storage box 44 is connected is provided at a front portion of each seat rail rear section 76.

The seat rail front sections 75, 75 are bent at seat rail bent sections 75A at their rear portions. Of the seat rails 14, 14, the portions located rearwardly of the seat rail bent sections 75A are smaller in rearwardly rising angle than the portions located forwardly of the seat rail bent sections 75A.

The plate-shaped intermediate cross member 20 is provided between rear portions of the seat rail front sections 75, 75, and is located forwardly of rear connection parts 81 where the seat rails 14, 14 are connected with the rear ends of the oblique upward extension sections 72. Front connection parts 82 where the front ends of the seat rail front sections 75 are connected with the downward extension sections 70 are provided at the lower ends of the downward extension sections 70. The front cross member 17 is formed in a U shape projecting forward, and is connected to front surfaces of the left and right front connection parts 82, 82. Rearwardly of each of the front connection parts 82, a plate-shaped cross member 83 is provided that interconnects the seat rail front section 75 and the horizontal extension section 71 at a position proximate to the front connection part 82. The plate-shaped cross member 83 is a flat plate extending vertically.

The upper tubes 15, 15 are connected at their front ends to an upper portion of the head pipe 12, extend rearwardly downward at a slighter inclination as compared with the downward extension sections 70, and are connected at their rear ends to upper surfaces of the seat rail front sections 75. The lower ends of the upper tubes 15, 15 are connected to the seat rail front sections 75 at upper tube connection parts 84, which are located rearwardly of the plate-shaped cross member 83. The spacing between the left and right upper tubes 15, 15 is increased along the rearward direction. In addition, the upper tubes 15, 15 are located on the inner side of the down tubes 13, 13 over the overall length thereof, in top plan view.

Figure 5:
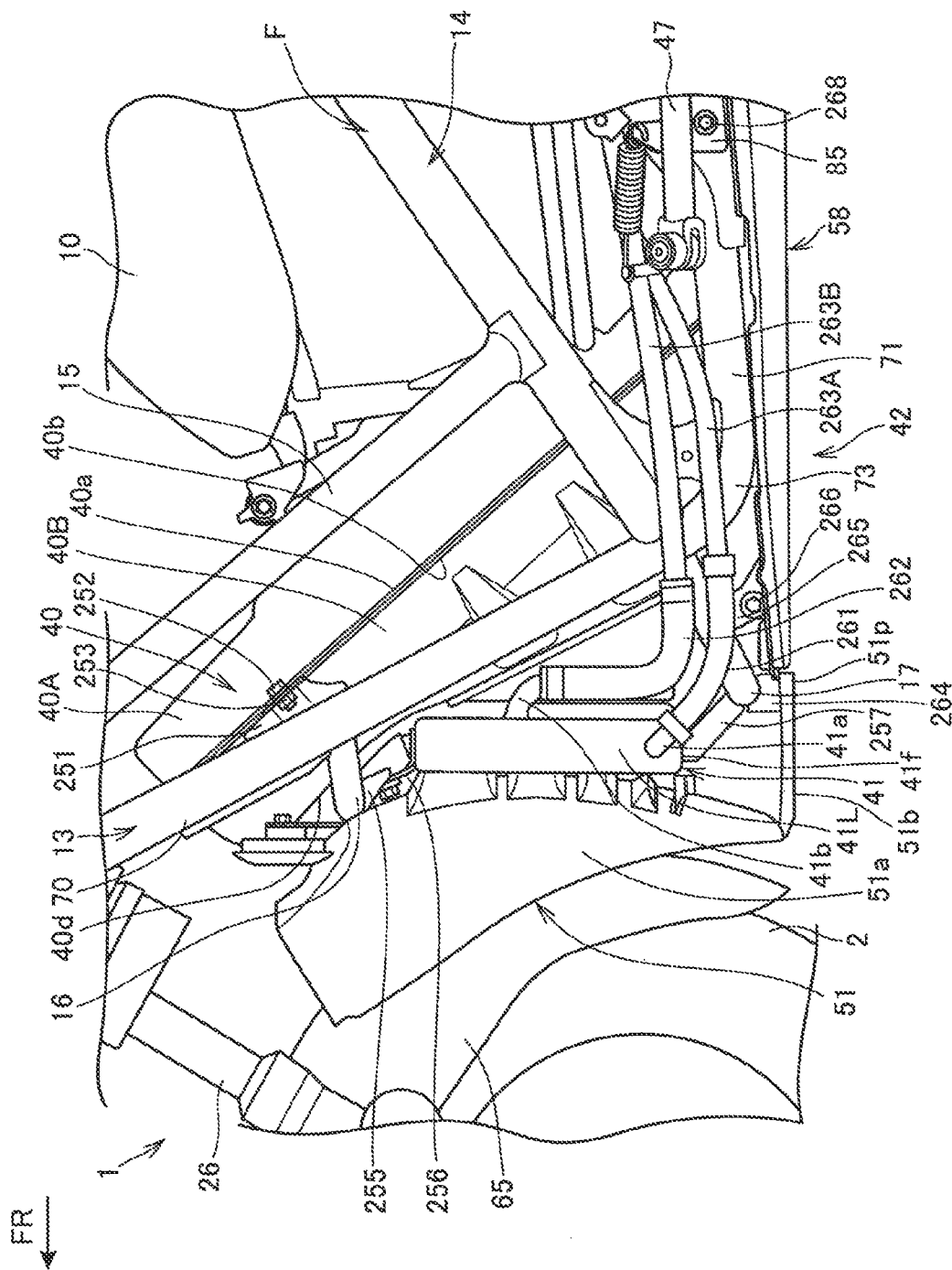
FIG. 5 is an essential part left side view of the motorcycle.

FIG. 5 is an essential part left side view of a motorcycle 1.

The fuel tank 40 is of a bisection structure composed of an upper tank half 40A and a lower tank half 40B. The upper tank half 40A and the lower tank half 40B are provided respectively with flanges 40a and 40b, which are joined to each other. The flanges 40a and 40b at an upper portion of the fuel tank 40 are fastened to tank brackets 251 provided respectively at the downward extension sections 70, 70 (only reference sign 70 on the viewer's side is shown) of the left and right down tubes 13, 13 (only reference sign 13 on the viewer's side is shown) by bolts 252 and nuts 253. A front wall 40d of the fuel tank 40 is located forwardly of the downward extension sections 70 of the down tubes 13.

The radiator 41 is disposed forwardly of the fuel tank 40 and rearwardly of the front lower cover 51, with its upper portion attached through stays 256 to upper brackets 255 provided on the front upper cross member 16, and with its lower portion attached to lower brackets 257 provided on the front cross member 17. In addition, the radiator 41 is disposed forwardly of the downward extension sections 70 of the down tubes 13. Further, in the vertical direction, the radiator 41 is disposed below the front upper cross member 16 and above the front cross member 17, and the lower end 41*f* of the radiator 41 is disposed above the first bent sections 73 of the down tubes 13.

A left tank section 41L provided in the radiator 41 is bisected into upper and lower two tanks. The left tank section 41L is provided at its lower side surface with a lower hose connection port 41*a*, to which a lower radiator hose 261 is connected, and is provided at its upper rear surface with an upper hose connection port 41*b*, to which an upper radiator hose 262 is connected. Incidentally, reference sign 263A denotes a lower pipe by which the lower radiator hose 261 is connected to the engine E (see FIG. 2) side, and reference sign 263B denotes an upper pipe by which the upper radiator hose 262 is connected to the engine E (see FIG. 2) side. The lower pipe 263A and the upper pipe 263B are component parts which constitute the cooling water pipes 42.

The lower radiator hose 261 and the lower pipe 263A are component parts through which cooling water from inside the engine E flows to a lower portion of the left tank section 41L. The upper radiator hose 262 and the upper pipe 263B are component parts through which the cooling water flows from an upper portion of the left tank section 41L into the engine E. Thus, the lower radiator hose 261, the lower pipe 263A, the upper radiator hose 262, and the upper pipe 263B for the cooling water by which the radiator 41 and the engine E are interconnected, and are collectively arranged on the left side of the body frame F. This layout enhances assembleability and maintainability as compared with the case where these component parts are laid out distributedly on the left and right sides of the body frame F.

The front lower cover 51 includes a cover body 51*a* curved to be rearwardly protuberant and so disposed as to have its rear portion overlapped with the front fender 65 in side view, and a rearward extension section 51*b* extending rearward from the lower end of the cover body 51*a*. The cover body 51*a* and the rearward extension section 51*b* are integrally molded, and are disposed rearwardly of the front wheel 2. A front upper portion of the cover body 51*a* is mounted to the front upper cross member 16 side, while a rear end portion of the rearward extension section 51*b* is mounted to a lower surface of a lower cross member stay 264 attached to a lower portion of a front end part of the front cross member 17. The rearward extension section 51*b* has its rear end rearwardly of a lift-up part 51*p*, which will be described in detail later. As above-mentioned, the front lower cover 51 is curved to be rearwardly protuberant. This ensures that the front fender 65 can be disposed inside the front lower cover 51 without any interference, and that the front lower cover 51 can be disposed proximate to the front fender 65 in the front-rear direction. Further, it is ensured that airflow can be collected more easily into the inside of the front lower cover 51. As a result, the quantity of air flowing out toward the radiator 41 via a plurality of openings (described later) of the front lower cover 51 can be increased, and the air flow velocity can be enhanced. Accordingly, cooling efficiency of the radiator 41 can be enhanced.

Rearwardly of the front lower cover 51, the under cover 58 is disposed so as to extend in the front-rear direction. The under cover 58 is mounted at its front portions to lower cross member side brackets 265 (which are provided on the front cross member 17) by bolts 266, and is mounted at its rear portions to the power unit support sections 85 (which are provided at the horizontal extension sections 71 of the down tubes 13) by bolts 268.

Figure 6:
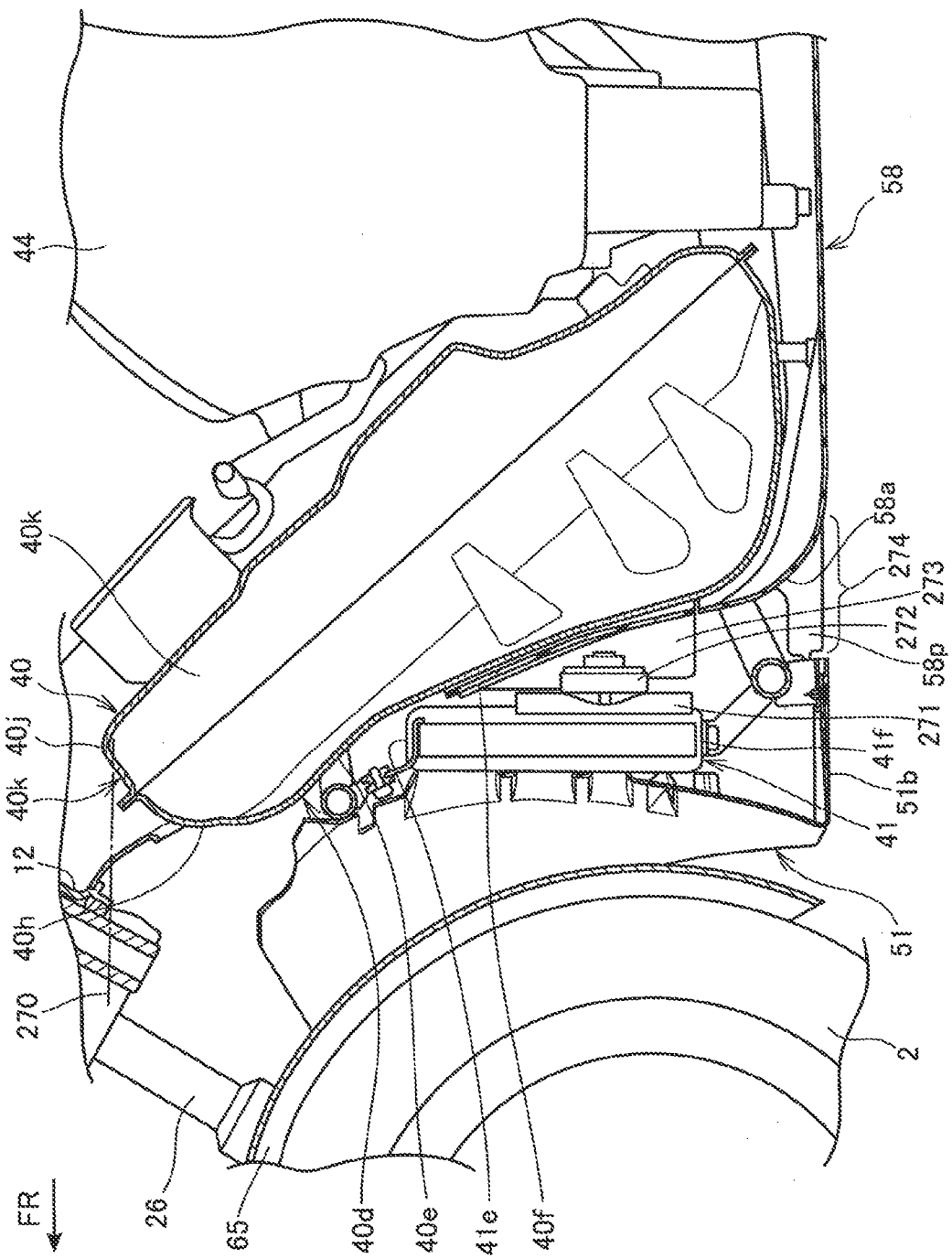
FIG. 6 is an essential part sectional view of the motorcycle, with a part of the body frame omitted.

FIG. 6 is an essential part sectional view of the motorcycle 1, with a part of the body frame omitted.

The front wall 40*d* of the fuel tank 40 is formed to be forwardly inclined so as to obliquely extend downwardly rearward from its upper end. The forward inclination angle of the front wall 40*d* relative to the vertical is greater at an upper portion 40*e* of the front wall 40*d* located above the upper end 41*e* of the radiator 41 than at a lower portion 40*f* of the front wall 40*d* located below the upper end 41*e* of the radiator 41. In addition, the upper end 40*j* of the fuel tank 40 is disposed above a horizontal line 270 that passes through the lower end of the head pipe 12.

The radiator 41 is provided to be vertical or is forwardly inclined so that its lower end 41*f* is located rearwardly of its upper end 41*e*. In addition, the radiator 41 is disposed on the rear and lower side of the front end 40*h* of the fuel tank 40.

Besides, the forward inclination angles of the front wall 40*d* of the fuel tank 40 relative to the vertical, at the upper portion 40*e* and at the lower portion 40*f*, are greater than the forward inclination angle of the radiator 41 relative to the vertical.

A fan 271 by which exhaust air, or air having flowed across the radiator 41, is forced to flow rearward and an electric motor 272 disposed rearwardly of the fan 271 to actuate the fan 271 are disposed rearwardly of the radiator 41. In addition, an exhaust air guide 273 for guiding the exhaust air from the radiator 41 downward so as to prevent the hot air from colliding on the fuel tank 40 is disposed rearwardly of the radiator 41. Further, an air guide wall 58*a* by which the exhaust air guided downward by the exhaust air guide 273 is guided further downward and rearward is provided at a front end portion of the under cover 58. Forward extension sections 58*p*, 58*p* (only reference sign 58*p* on the depth side of the drawing is shown) are provided at left and right sides of the under cover 58, forwardly of the air guide wall 58*a*. Between these forward extension sections 58*p*, 58*p*, an exhaust opening 274 is provided which is opened to permit the exhaust air from the radiator 41 to flow downward of the under cover 58.

The exhaust opening 274 is provided rearwardly of the rear end of the rearward extension section 51*b* of the front lower cover 51, permitting the space on the upper side of the rearward extension section 51*b* and the space on the lower side of the rearward extension section 51*b* to communicate with each other.

Figure 7:
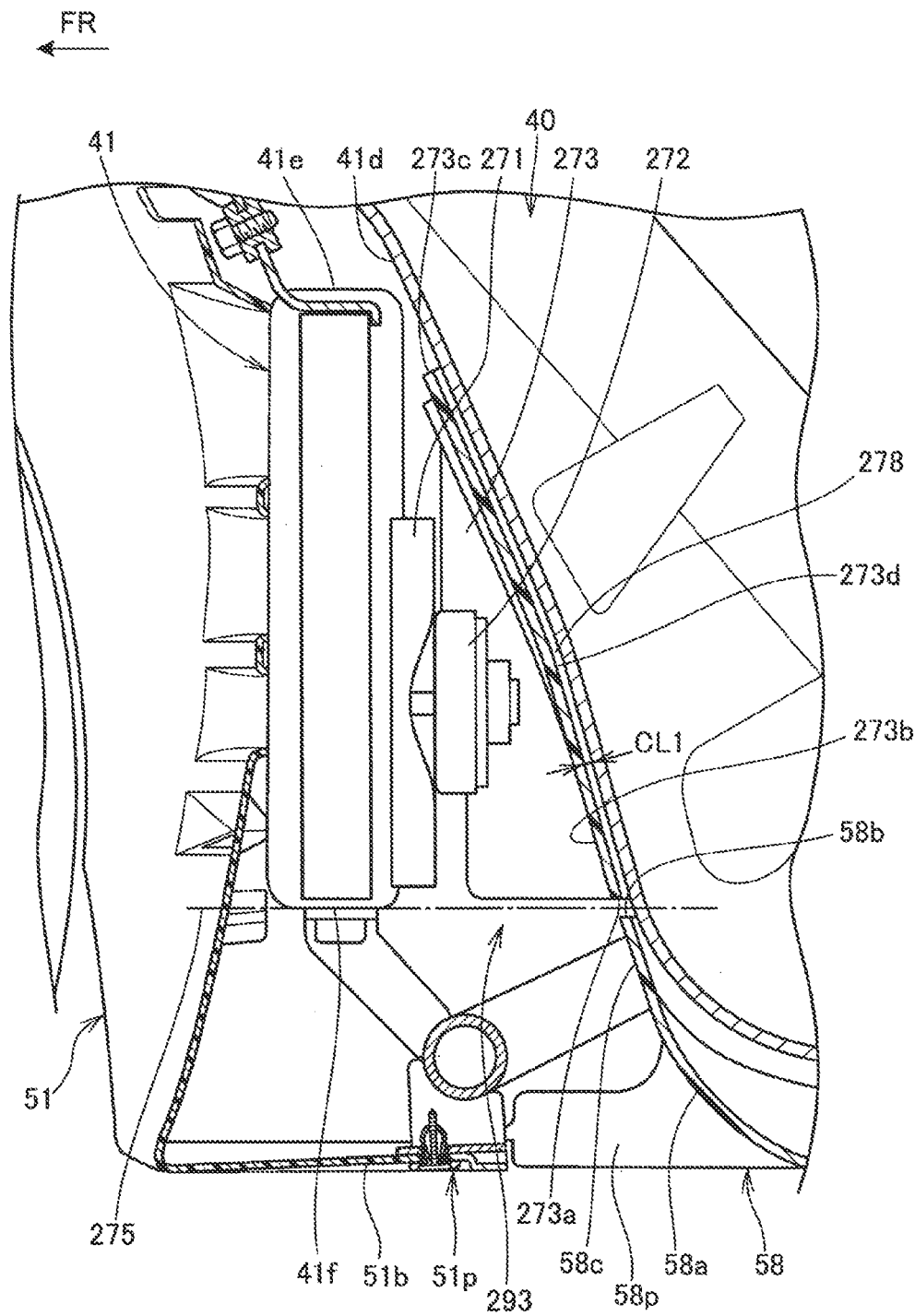
FIG. 7 is an essential part sectional view showing a radiator, a fuel tank and the surroundings thereof.

FIG. 7 is an essential part sectional view showing the radiator 41, the fuel tank 40 and the surroundings thereof.

Between the fuel tank 40 and the radiator 41, the exhaust air guide 273 is provided as a heat insulating guide, which covers a part of the front wall 40*d* of the fuel tank 40 so as to avoid thermal influence of the exhaust air warmed by the radiator 41. Between the exhaust air guide 273 and the front wall 40*d* of the fuel tank 40, a fresh air passage 278 is formed that is provided with a predetermined clearance CL1 ranging from the upper end 273*c* to the lower end 273*a* of the exhaust air guide 273 and through which fresh air flows.

In side view, the front wall 40*d* of the fuel tank 40 is obliquely inclined rearwardly downward. Besides, in side view, the exhaust air guide 273 is curved to be rearwardly protuberant along the front wall 40*d* of the fuel tank 40, and the air guide wall 58*a* is curved to be forwardly protuberant.

As above-mentioned, the fresh air passage 278 is formed to ensure that fresh air, not mixed with the exhaust air coming from the radiator 41, flows from above the radiator 41 downward along the front wall 40*d* of the fuel tank 40. This structure ensures that even in the condition where the temperature inside the body cover C is high, a flow of fresh air along the front wall 40d of the fuel tank 40 can be formed and, therefore, the fuel tank 40 can be appropriately air cooled.

The upper end 273c of the exhaust air guide 273 is disposed below the upper end 41e of the radiator 41 and above the vertically central position of the radiator 41, and the lower end 273a of the exhaust air guide 273 is provided above the lower end 41f of the radiator 41 and below the vertically central position of the radiator 41.

The exhaust air guide 273 has an intermediate wall 273d at a vehicle-width-directionally central portion thereof. The lower end 273a of the intermediate wall 273d and the upper end 58b of the air guide wall 58a are disposed proximate to each other. The lower end 273a of the exhaust air guide 273 is located above a horizontal line 275 passing through the lower end 41f of the radiator 41, while the upper end 58b of the air guide wall 58a is located below the horizontal line 275.

FIG. 8 is an essential part sectional view showing a front lower portion of the motorcycle 1.

First, positional relationship between the air guide wall 58a and the exhaust air guide 273 will be described.

The under cover 58 is provided with the air guide wall 58a, which extends on the rear side of the radiator 41 while curving forward and upward. The upper end 58b of this air guide wall 58a and the lower end 273a of the exhaust air guide 273 are disposed proximate to each other in the vertical direction (height direction). Between the upper end 58b of the air guide wall 58a and the lower end 273a of the exhaust air guide 273, a gap 276 having a predetermined clearance CL2 is formed.

In the related art, a louver has been provided at a slit-like opening of an exhaust air passage for the purpose of restraining muddy water or the like splashed by the front wheel from entering the inside of the body cover. In this embodiment, on the other hand, the air guide wall 58a and the exhaust air guide 273 are arranged proximate to each other. This arrangement ensures that the exhaust air passage 293 (described in detail later) can be defined by the air guide wall 58a and the exhaust air guide 273, while restraining intrusion of water or the like by the air guide wall 58a and the exhaust air guide 273.

In addition, the upper end 58b of the air guide wall 53a (more specifically, the upper end 53b of the front surface 58c of the air guide wall 58a) is disposed rearwardly of the lower end 273a of the exhaust air guide 273 (more specifically, the lower end 273a of the front surface 273b of the intermediate wall 273d of the exhaust air guide 273).

Now, a lift-up support part 297 of the front lower cover 51 will be described below.

In order to lift up a vehicle body front portion by a jack or the like, the lift-up support part 297 is provided at a front lower portion of the vehicle body. The lift-up support part 297 includes: a lower cross member stay 264 which is fixed to a front end lower portion of the front cross member 17 and is formed with a bottom surface (specifically, a bottom surface of a lower plate part 264a) along an upper surface 51q of the rearward extension section 51b of the front lower cover 51; a body cover fixing part 51r formed for fixing the front lower cover 51 to the bottom surface of the lower cross member stay 264; and the lift-up part 51p provided for putting a lifting-up device such as a jack into contact with the body cover fixing part 51r.

The body cover fixing part 51r includes the rearward extension section 51b, a fastening hole 51s bored in a rear portion of the rearward extension section 51b, the lower plate part 264a of the lower cross member stay 264, a through-hole 264b bored in the lower plate part 264a, and a fastening member 298 inserted into the fastening hole 51s and the through-hole 264b from below.

The fastening member 298 includes a head part 298a, a screw 298b driven into the head part 298a from below, and a plurality of radially expandable pieces 298c extending from the head part 298a along the projecting direction of the screw 298b and radially expanded by the screw 298b.

At the time of inserting the fastening member 298s into the fastening hole 51s and the through-hole 264b, the radially expandable pieces 298c are radially reduced against their elastic forces, and are passed through the fastening hole 51s and the through-hole 264b. Thereafter, the screw 298b is driven through the head part 298a from below and forced into the inside of the plurality of radially expandable pieces 298c, whereby the radially expandable pieces 298c are radially expanded as shown, to function as come-off preventive means.

The lift-up part 51p includes: a stepped part 51t crank-shaped in section that is formed at a rear end portion of the rearward extension section 51b so as to be bent downward and then extend rearward; and a plurality of lower ribs 51n and a plurality of upper ribs 51u that are formed respectively at a lower surface 51m and an upper surface 51q of the rearward extension section 51b so as to intersect the stepped part 51t. Specifically, the lower ribs 51n and the upper ribs 51u, which extend in the vehicle longitudinal direction (front-rear direction) are connected to the stepped part 51t, and the fastening member 298 is disposed forwardly of the stepped part 51t.

Figure 15:
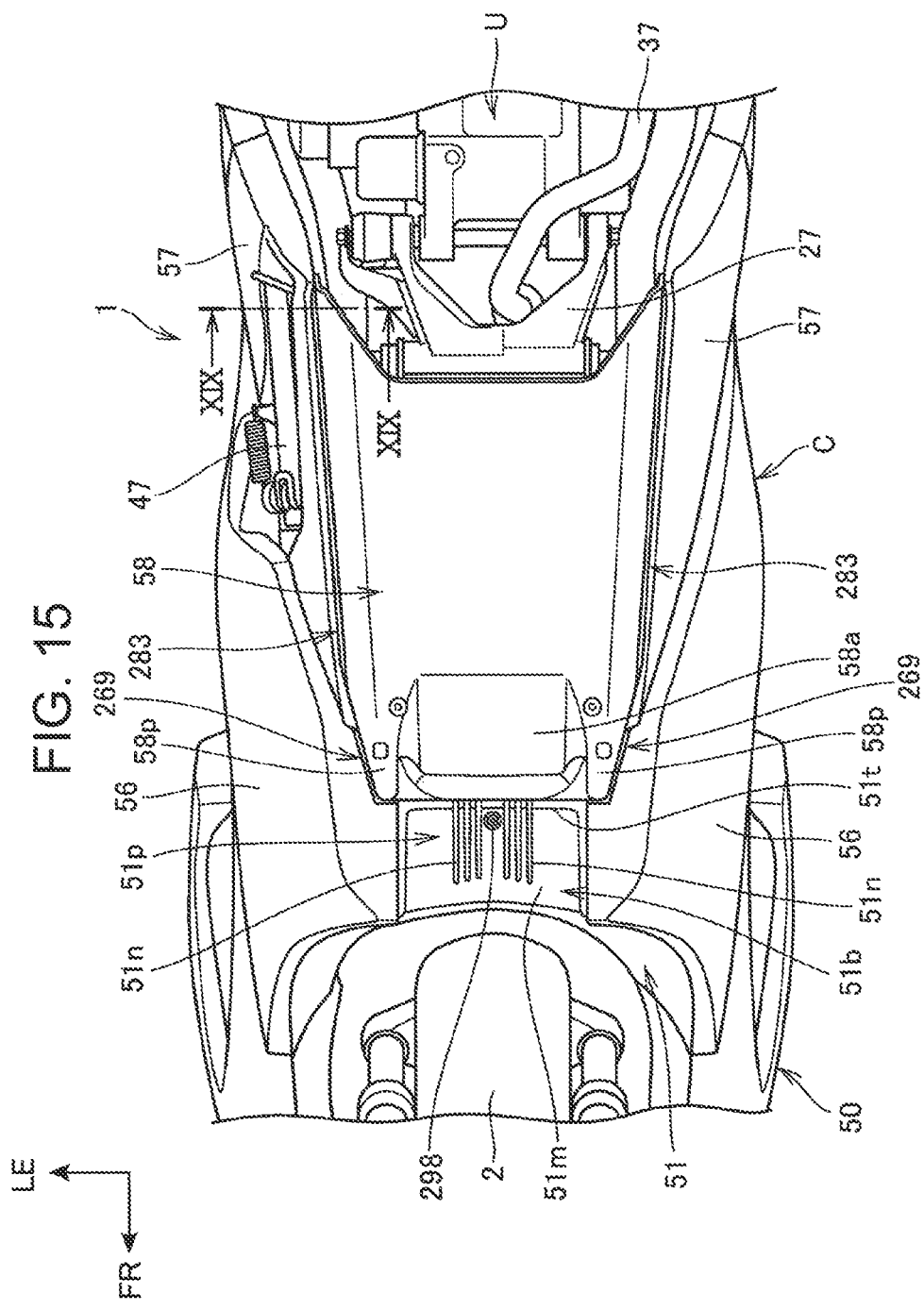
FIG. 15 is an essential part bottom view of a bottom portion of the motorcycle.

The step of the stepped part 51t is greater than the thickness of the head part 298a. Therefore, even when the jack or the like is put into contact with the lower ribs 51n from below, the jack or the like would not interfere with the head part 298a. In addition, as shown in FIG. 15, the stepped part 51t is formed to extend in the vehicle width direction.

In FIG. 8, the lower ribs 51n are formed at the lower surface 51m of the rearward extension section 51b so as to project downward over the range from a vehicle-longitudinally intermediate portion to the rear end of the rearward extension section 51b and to extend in the vehicle longitudinal direction. The upper ribs 51u are formed at the upper surface 51q of the rearward extension section 51b so as to project upward over the range from the front end to the rear end of the rearward extension section 51b and to extend in the vehicle longitudinal direction.

On the front side of the stepped part 51t, the rearward extension section 51b is so inclined as to be located at an upper position as one goes rearward.

As above-mentioned, the rearward extension section 51b of the front lower cover 51 serves as a fixing part for fixing the lower end of the front lower cover 51 to the body frame F and as the lift-up part 51p for lifting up the vehicle body front portion by a jack or the like. Therefore, it is possible to reduce the number of component parts, to reduce the number of assembly steps and to reduce cost, as compared with the case where a lift-up part is formed especially. In addition, the rearward extension section 51b is molded integrally with the cover body 51a, which also contributes to a reduction in cost.

FIG. 9 shows illustrations of the exhaust air guide 273, wherein FIG. 9A is a front view, FIG. 9B is a view taken along arrow B in FIG. 9A, and FIG. 9C is a view taken along arrow C in FIG. 9A.

As shown in FIG. 9A, the exhaust air guide 273 is a component part that has a roughly rectangular profile. The exhaust air guide 273 includes: left and right longitudinal wall parts 273L and 273R extending in the vertical direction and in the vehicle longitudinal direction (the face-back direction of the drawing); an intermediate wall 273d provided between the longitudinal wall parts 273L and 273R; and outer walls 273e and 273f provided respectively on the outer sides of the longitudinal wall parts 273L and 273R.

As shown in FIG. 9B, the longitudinal wall parts 273L and 273R are formed to project forward from the intermediate wall 273d. The longitudinal wall parts 273L and 273R and the intermediate wall 273d together form a flattened U-shape in section, and form an exhaust air passage for guiding the exhaust air coming from the radiator 41 (see FIG. 6). The longitudinal wall parts 273L and 273R are formed therein with hollow parts (cavities) 273g and 273h. Incidentally, reference signs 277 denote bolts made to penetrate the outer walls 273e and 273f for the purpose of fastening the exhaust air guide 273 to the left and right down tubes 13, 13 (see FIG. 5).

As shown in FIG. 5C, the exhaust air guide 273 is right-angled triangular in side view. The front ends 273m and 273n (only reference sign 273m on the viewer's side is shown) of the longitudinal wall parts 273L and 273R (only reference sign 273L on the viewer's side is shown) extend substantially vertically. Each of the outer walls 273e and 273f (only reference sign 273e on the viewer's side is shown) is inclined rectilinearly in such a manner that its lower end is located rearwardly of its upper end.

FIG. 10 shows illustrations of the under cover 58, wherein FIG. 10A is a perspective view as viewed from an upper side, FIG. 10B is a perspective view as viewed from a lower side, and FIG. 10C is a plan view.

In FIG. 10A, the under cover 58 includes: a flat part 58e formed to range from a vehicle-longitudinally central portion to a rear portion; the air guide wall 58a extending from the front end of the flat part 58e while being curved forwardly upward; side edge parts 58f and 58g provided (in a rising state) at left and right side portions of both the flat part 58e and the air guide wall 58a; and a plurality of reinforcement ribs 58j, 58j and 58k, 58k extending in the vehicle longitudinal direction over the range from an upper surface of the flat part 58e to an upper surface of the air guide wall 58a.

The side edge parts 58f and 58g are provided at front and rear portions thereof with frame mounting parts 58m and 58n that are projected upward and serve for mounting the under cover 58 to the horizontal extension sections 71, 71 (see FIG. 3) of the left and right down tubes 13, 13 (see FIG. 3). In addition, the side edge parts 58f and 58g are provided at their front end portions with the left and right forward extension sections 58p, 58p extending forward, on vehicle-width-directionally outer sides of the air guide wall 58a.

Of the plurality of ribs 58j, 58j and 58k, 58k, the two ribs 58k, 58k on the inner side extend to the upper end of the air guide wall 58a.

As shown in FIG. 10B, the forward extension section 58p is formed at a front end portion of each of the left and right side edge parts 58f and 58g. The left and right forward extension sections 58p, 53p and the air guide wall 58a are interconnected respectively through connection walls 58q (only reference sign 58q on one side is shown).

As shown in FIG. 10C, the side edge parts 58f and 58g inclusive of the left and right forward extension sections 58p, 58p protrude forward and rearward as compared with the flat part 58e and the air guide wall 58a. The side edge parts 58f and 58g are formed in a forwardly narrowed shape such that the left and right edges of front end portions thereof are located on the vehicle-width-directionally inner sides as compared with the left and right edges of rear end portions thereof. The side edge parts 58f and 58g are integrally formed at rear end side portions thereof with barb ribs 58w, 58x projecting sideways. The barb ribs 58w and 58x are parts for preventing muddy water or the like splashed from entering the inside of the body cover C. The rear end 58r of the under cover 58 is a part which includes: left and right oblique edges 58s, 58s; and a base edge 58t interconnecting the oblique edges 58s, 58s. The rear end 58r is a part formed for avoiding interference with the link members 27 (see FIG. 15).

Figure 11:
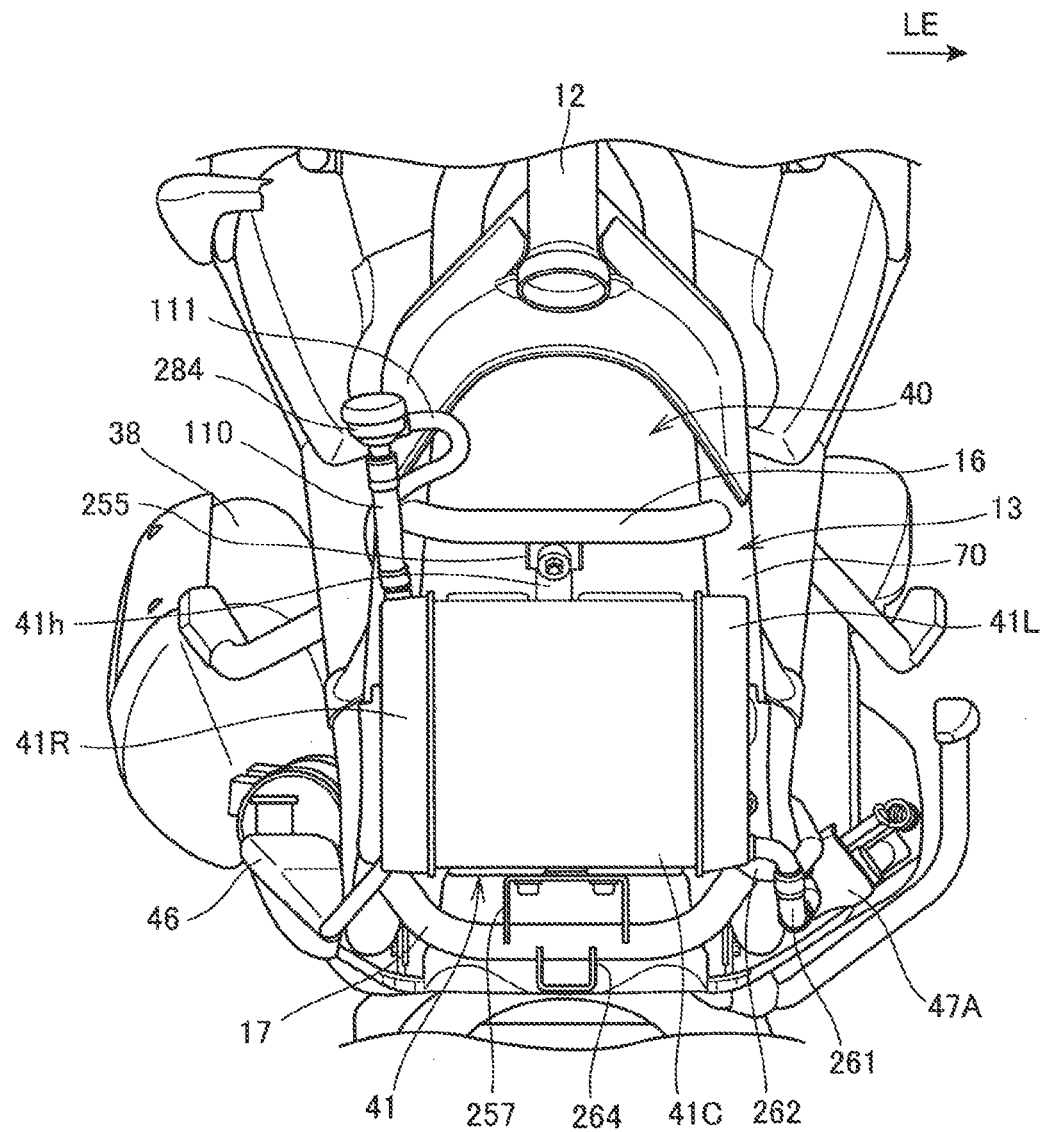
FIG. 11 is an essential part front view of the motorcycle from which a body cover has been removed.

FIG. 11 is an essential part front view of the motorcycle 1, with the body cover C removed.

The radiator 41 includes the left tank section 41L and the right tank section 41R that are provided on the left and right sides, and a core section 41C that is provided between the left tank section 41L and the right tank section 41R.

The left tank section 41L and the right tank section 41R are sections for temporarily holding cooling water. The core section 41C includes a plurality of tubes serving as cooling water passages for circulation of cooling water between the left tank section 41L and the right tank section 41R, and cooling fins provided between the tubes. Incidentally, reference sign 38 denotes a muffler.

The left tank section 41L and the right tank section 41R are disposed forwardly of the left and right down tubes 13, 13, respectively. The left-right width of the core section 41C is roughly the same as the distance between respective inside ends of the left and right down tubes 13, 13 and as the left-right width of the fuel tank 40.

Figure 12:
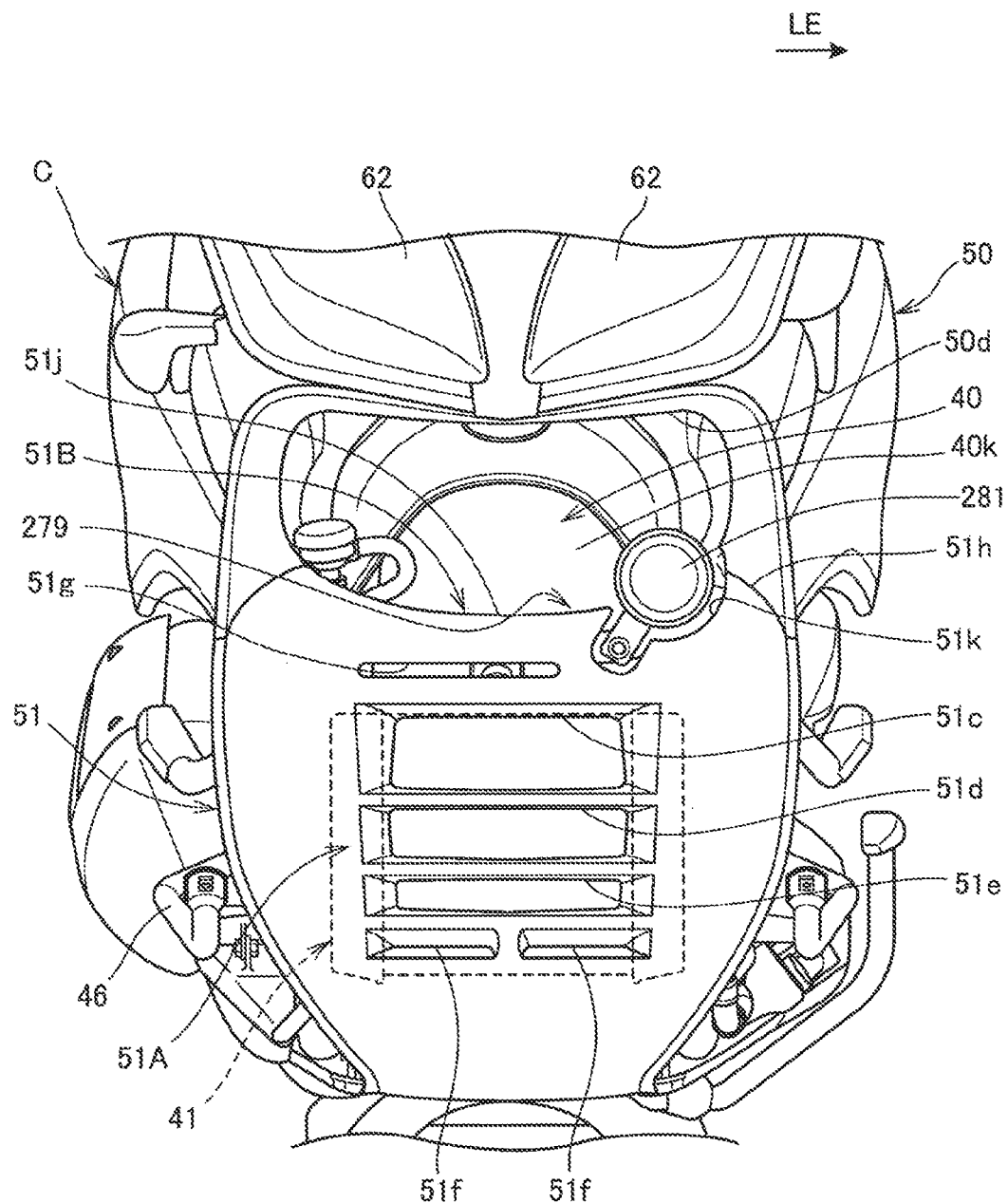
FIG. 12 is an essential part front view of the motorcycle.

FIG. 12 is an essential part front view of the motorcycle 1.

The front lower cover 51 constituting the body cover C includes: a radiator opening section 51A composed of a plurality of openings for guiding airflow to the radiator 41; and a fuel tank opening section 51B for guiding airflow to a tank extension section 40k, which extends upward to above the upper end 41e of the radiator 41, of the fuel tank 40.

The radiator opening section 51A includes a first opening 51c, a second opening 51d, and a third opening 51e that are arranged in this order from the upper side, and left and right fourth openings 51f, 51f located on the lower side of the third opening 51e. The fuel tank opening section 51B includes an upper opening 51g formed in a laterally elongated shape in an upper portion of the front lower cover 51, and an upper edge opening 279 formed at the upper edge 51h of the front lower cover 51. The upper edge opening 279 is defined by a cutout 51j provided at the upper edge 51h of the front lower cover 51 and a cutout 50d formed in a front portion of the front cover 50. Incidentally, reference sign 51k denotes a horn cutout formed in the front lower cover 51 for avoiding interference with a horn 281.

Figure 13:
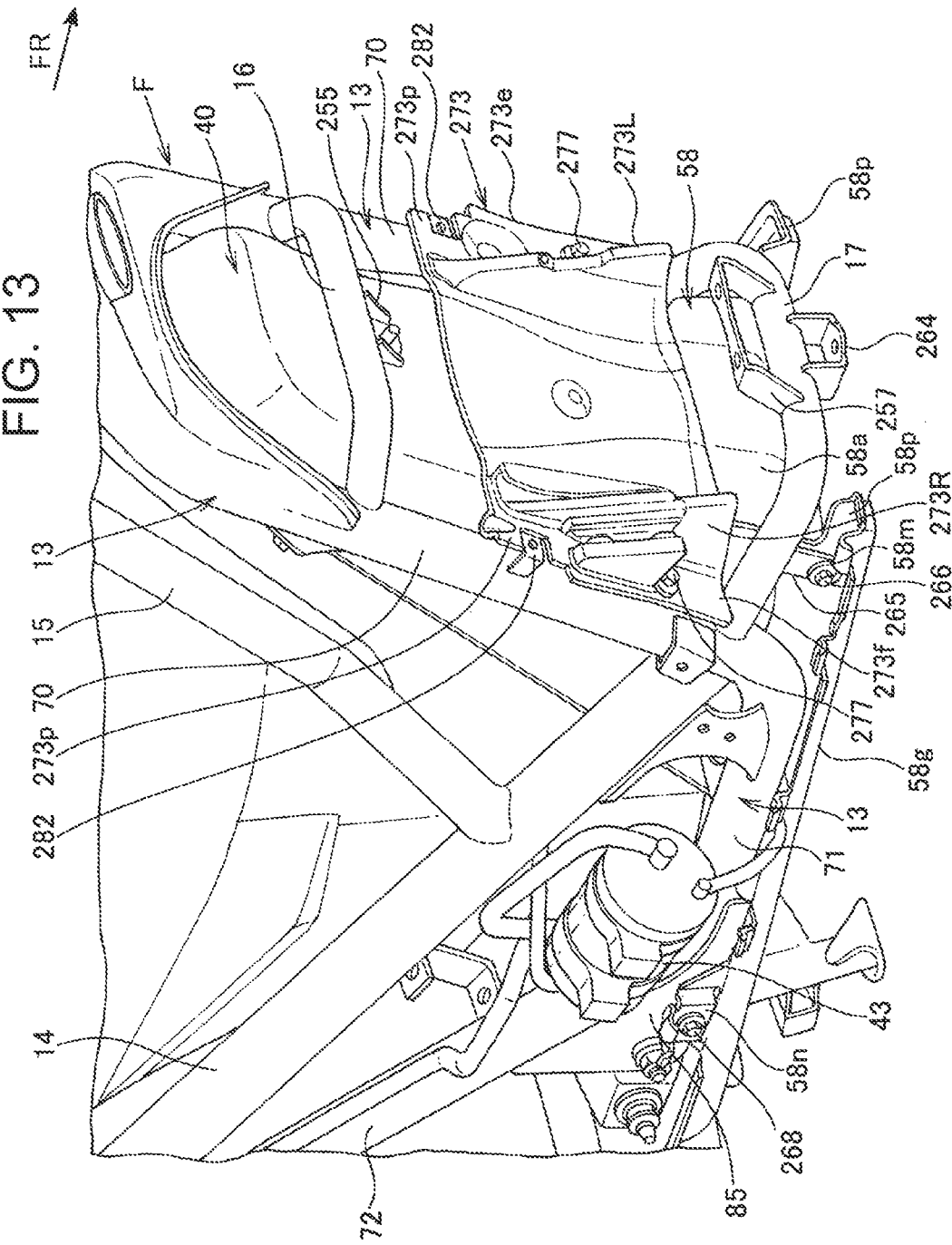
FIG. 13 is a perspective view of the body frame and the surroundings thereof.

FIG. 13 is a perspective view showing the body frame F and the surroundings thereof.

The fuel tank 40 is disposed inside a front portion of the body frame F. A front-side part of the fuel tank 40 is covered by the exhaust air guide 273 and the air guide wall 58a of the under cover 58.

The exhaust air guide 273 is configured as follows. Lower portions of the left and right outer walls 273e and 273f located on the vehicle-width-directionally outer sides of the longitudinal wall parts 273L and 273R are attached to front surfaces of the downward extension sections 70, 70 of the down tubes 13, 13 by bolts 277, 277. In addition, upper portions of the outer walls 273e and 273f, more specifically, insertion parts 273p, 273p provided respectively at the upper portions of the outer walls 273e and 273f, are inserted into inserted pieces 282 being L-shaped in section that are provided respectively on the downward extension sections 70, 70. In this way, the exhaust air guide 273 is locked to the down tubes 13, 13.

The under cover 58 is configured as follows. The frame mounting parts 58m and 58n provided respectively on the left and right side edge parts 58f and 58g (only reference sign 58g on the viewer's side is shown) are mounted to the lower cross member side brackets 265 of the front cross member 17 and to the power unit support sections 85 of the down tubes 13 by bolts 266 and bolts 268, respectively. Especially, the forward extension sections 58*p*, 58*p* of the side edge parts 58*f* and 58*g* are fastened to the lower cross member side brackets 265 provided at lower portions of the front cross member 17. Incidentally, reference sign 43 denotes a canister by which fuel vapor in the fuel tank 40 is temporarily adsorbed and is released into a suction system.

FIG. 14 is an essential part right side view of the motorcycle 1 from which a part of the body cover C has been removed.

A water supply port 284 is attached to an upper end portion of the right tank section 41R of the radiator 41 through a water filling pipe 110. The reservoir tank 46 disposed on a lateral side of the first bent section 73 of the down tube 13 is connected to the water supply port 284 through a reservoir tubing 111. The reservoir tubing 111 is held by a hose holding part 273*q* provided at the exhaust air guide 273. Incidentally, reference sign 37 denotes an exhaust pipe connected to an exhaust port at a lower surface of the cylinder head 32. The exhaust pipe 37 extends rearward while passing under the engine E, and is connected to the muffler 38 (see FIG. 11). Reference sign 286 denotes a water pump provided at the crankcase 30 of the engine E. A pump-side lower hose 289, which is connected to a lower pipe 263A (see FIG. 5) on the radiator 41 side, and a return hose 288, which is connected to an upper portion of the cylinder 31 and through which cooling water is returned from inside the cylinder 31 to the water pump 286, are connected to the water pump 286. Incidentally, reference sign 285 denotes a radiator cap attached to the water supply port 284.

FIG. 15 is an essential part bottom view of a bottom portion of the motorcycle 1.

The front lower cover 51 is disposed rearwardly of the front wheel 2, and the front lower cover 51 is covered with the front floor skirts 56, 56 on both lateral sides thereof. The under cover 58 is disposed rearwardly of the rearward extension section 51*b* of the front lower cover 51, and the rear floor skirts 57, 57 are disposed on both sides of the under cover 58. Vehicle-width-directional gaps 283, 283 forming air passages are provided between the under cover 58 and the rear floor skirts 57, 57, in bottom view.

Of the rearward extension section 51*b* of the front lower cover 51, the part having the plurality of lower ribs 51*n* provided at the lower surface 51*m* to extend in the vehicle longitudinal direction constitutes the lift-up part 51*p* to which a lack or the like is applied at the time of lifting up a front portion of the motorcycle 1. Left and right edge portions of the under cover 58 and inside edge portions of the rear floor skirts 57, 57 are spaced apart in the vehicle width direction to define the gaps 283, 283 therebetween. Air inside the body cover C is exhausted through the gaps 283, 283. Thus, the under cover 58 and the body cover C surrounding the under cover 58 define a gap therebetween, along the whole end portions. The left and right front floor skirts 56, 56 define gaps 269, 269 between the under cover 58 and themselves. Air inside the body cover C is exhausted through these gaps 269, 269.

Figure 16:
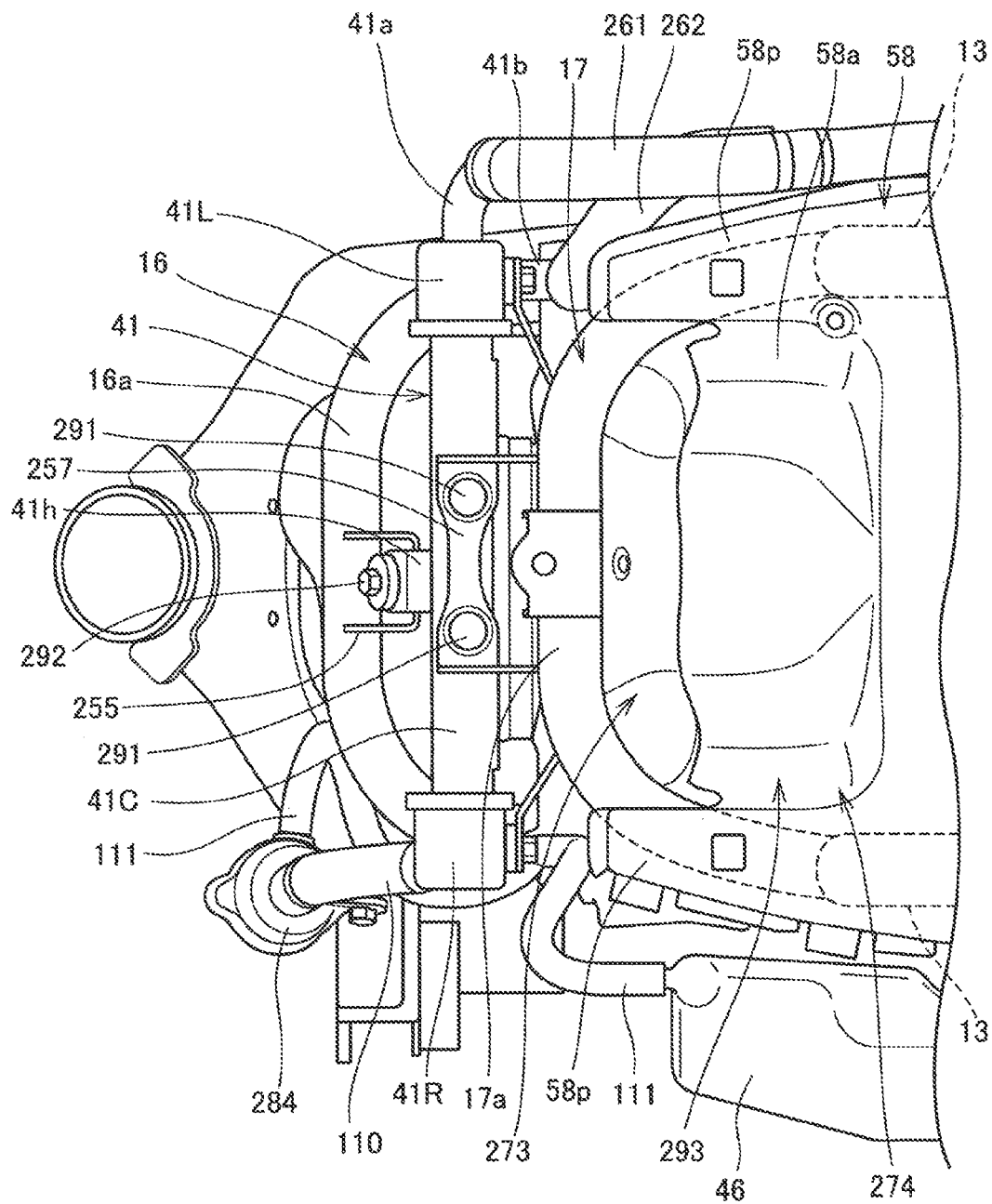
FIG. 16 is an essential part bottom view of a vehicle body front portion.

FIG. 16 is an essential part bottom view of a vehicle body front portion.

The radiator 41 is so arranged that the lower end of its core section 41C is fastened to a lower bracket 257, which is provided on the front cross member 17 and extends in the vehicle width direction, by two bolts 291, 291. A core section stay 41*h* extending upward from the upper end of the core section 41C is fastened to an upper bracket 255 of the front upper cross member 16 by one bolt 292.

The water filling pipe 110 is connected to the right tank section 41R of the radiator 41, and the water supply port 284 is connected to the upper end of the water filling pipe 110.

Furthermore, one end of the reservoir tubing 111 is connected to the water supply port 284, and the reservoir tank 46 is connected to the other end of the reservoir tubing 111.

The left tank section 41L of the radiator 41 is provided with a lower hose connection port 41*a* and an upper hose connection port 41*b*. A lower radiator hose 261 is connected to the lower hose connection port 41*a*, and an upper radiator hose 262 is connected to the upper hose connection port 41*b*.

The front cross member 17 and the air guide wall 58*a* of the under cover 58 define an exhaust air passage 293 (for the radiator 41) on the rear side of the radiator 41. The lower end of the exhaust air passage 293 constitutes the exhaust opening 274 provided in an area that is forward of the air guide wall 58*a* and is between the left and right forward extension sections 58*p*, 58*p*.

The left and right down tubes 13, 13 are interconnected by the front cross member 17 extending while being curved so as to project to the front side of the down tubes 13, 13, in an area that is below the radiator 41 and above the forward extension sections 58*p*, 58*p*. The front cross member 17 (specifically, left and right end portions of the front cross member 17) overlaps with the forward extension sections 58*p*, 58*p* in bottom view.

Besides, in bottom view, the radiator 41 is disposed between front end portions 16*a* and 17*a* that are formed as respective parts of the front upper cross member 16 and the front cross member 17 so as to extend in the vehicle with direction. This ensures that the upper bracket 255 and the core section stay 41*h* on the front upper cross member 16 side and the lower bracket 257 on the front cross member 17 side, which members serve for supporting the radiator 41, can be made roughly the same in length in the vehicle longitudinal direction. If the radiator support member(s) on the front upper cross member 16 side and the radiator support member(s) on the front cross member 17 side are different in length, the longer radiator support member(s) must be enhanced in strength and rigidity by thickening or the like. This results in increases in cost and weight due to the use of a special component part(s). In this embodiment, on the other hand, the radiator support member(s) on the front upper cross member 16 side and the radiator support member(s) on the front cross member 17 side are roughly the same in length. This promises reductions in cost and weight.

Figure 17:
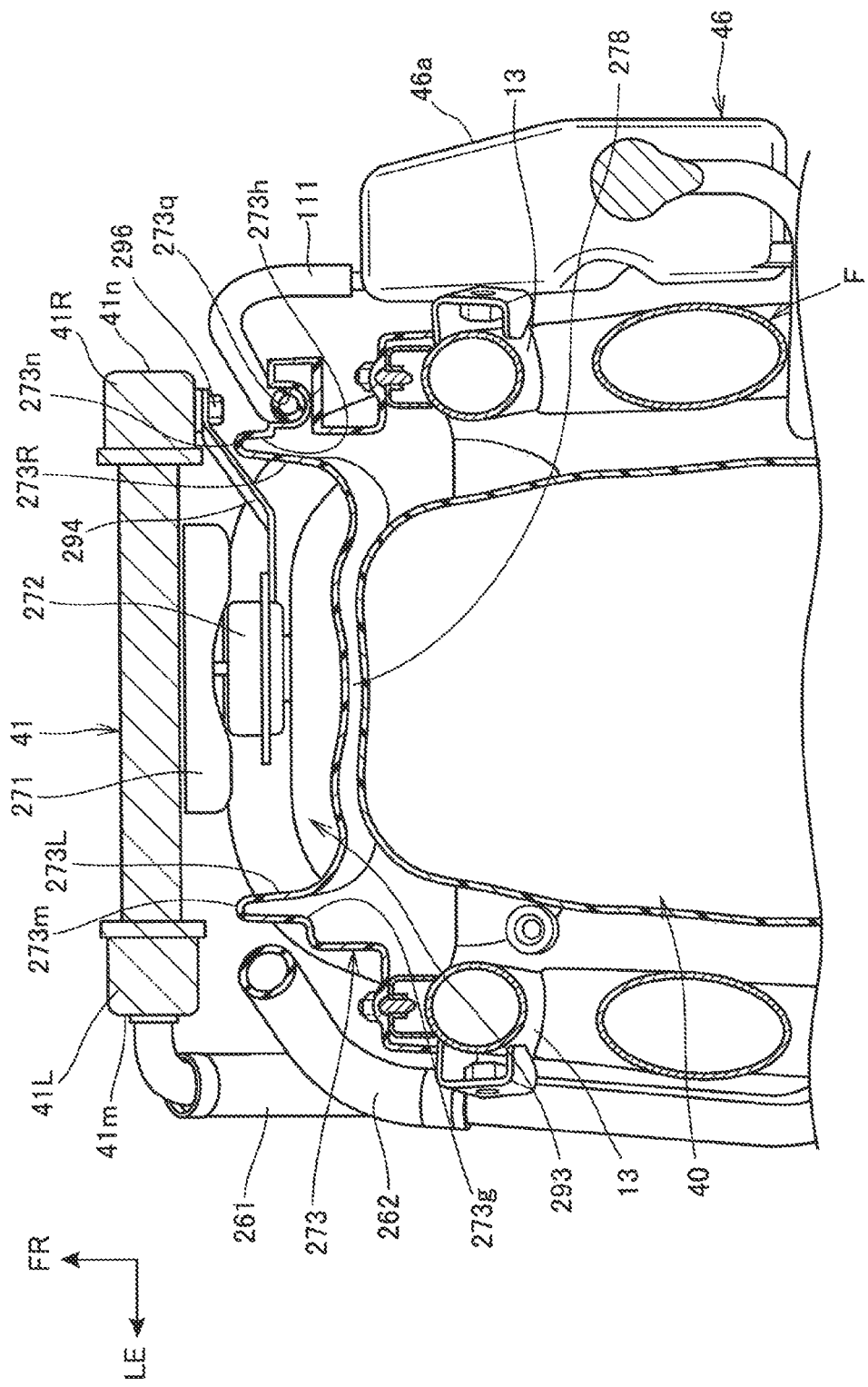
FIG. 17 is an essential part sectional view of the vehicle body front portion.

FIG. 17 is an essential part sectional view of a vehicle body front portion.

The exhaust air guide 273 is provided at its left and right portions with the longitudinal wall parts 273L and 273R projecting forward. The front ends 273*m* and 273*n* of the longitudinal wall parts 273L and 273R are located rearwardly of the radiator 41, and the exhaust air passage 293 is provided between the longitudinal wall parts 273L and 273R. Therefore, the exhaust air from the radiator 41 is restrained from flowing to the vehicle-width-directionally outer sides beyond the longitudinal wall parts 273L and 273R.

The lower radiator hose 261 and the upper radiator hose 262 are disposed on the vehicle-width-directionally outer side of the left-side longitudinal wall part 273L. Since the lower radiator hose 261 and the upper radiator hose 262 are not provided in the exhaust air passage 293, therefore, these hoses do not influence the exhaust air from the radiator 41.

The vehicle-width-directionally outer end portions 41*m* and 41*n* of the left tank section 41L and the right tank section 41R are located on the vehicle-width-directionally outer sides in relation to the longitudinal wall parts 273L and 273R in plan view.

The longitudinal wall parts 273L and 273R are so formed as to have hollow parts (cavities) 273g and 273h therein. The reservoir tubing 111 is held by the hose holding part 273q, which is roughly angular U-shaped in section and is provided on the outer side of the longitudinal wall part 273R on the vehicle-width-directionally right side.

The reservoir tank 46 is a vehicle-longitudinally elongated vessel disposed proximate to and on the right side of the body frame F. An outside surface 46a of a front portion of the reservoir tank 46 is so inclined as to be located on the vehicle-width-directionally more inner side on the front side than on the rear side. This ensures that at the time of covering the reservoir tank 46 with the body cover C (see FIG. 15) (specifically, the rear floor skirt 57 (see FIG. 15)) on the outer side, the body cover C can be disposed on the vehicle-width-directionally more inner side while forming it in a forwardly narrowed shape. Therefore, aerodynamic characteristics can be enhanced and downsizing of the vehicle body can be promised.

The electric motor 272 disposed rearwardly of the radiator 41 is mounted to the respective rear surfaces of the left tank section 41L and the right tank section 41R of the radiator 41 by bolts 296, through a plurality of motor stays 294 (only one reference sign 294 is shown).

Figure 18:
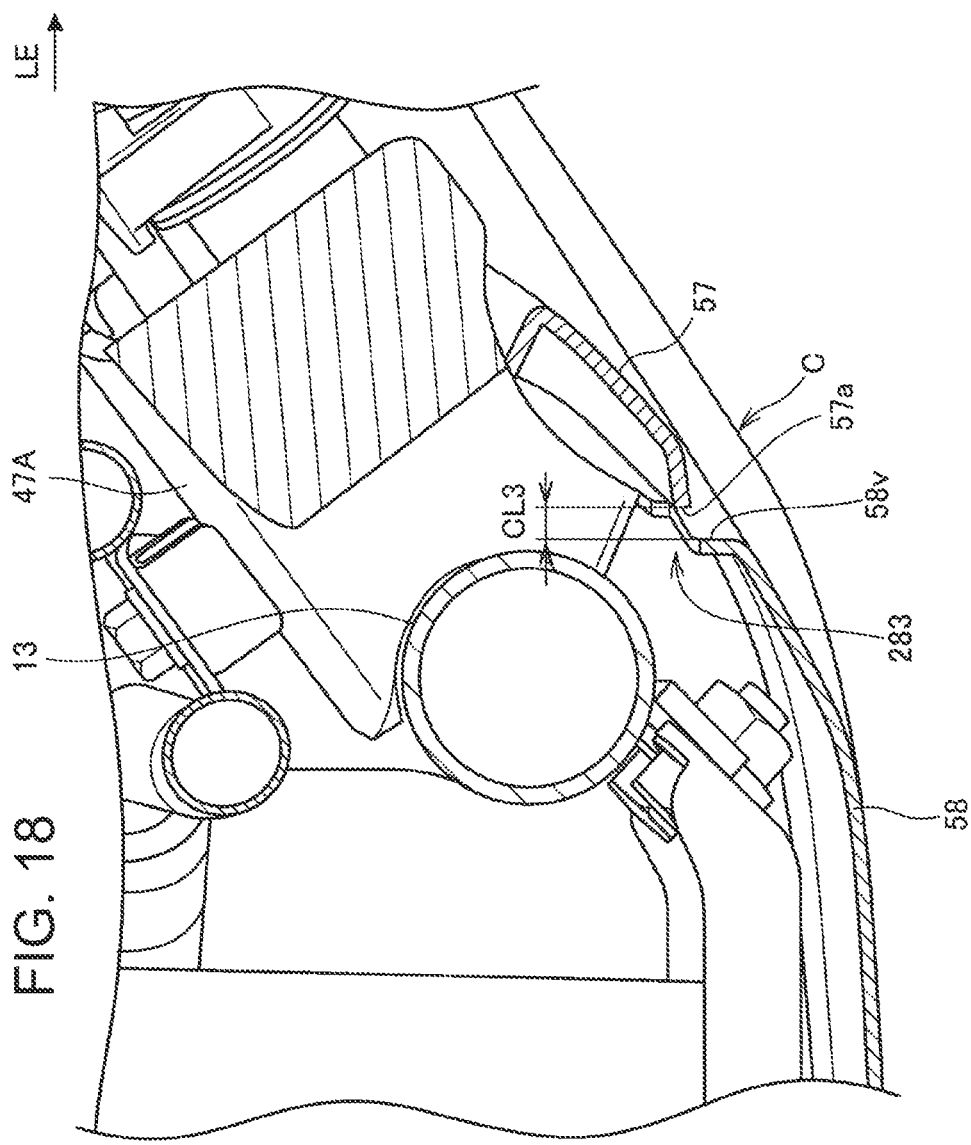
FIG. 18 is a sectional view of a left lower portion of the vehicle body front portion.

FIG. 18 is a sectional view of a left lower portion of the vehicle body front portion, showing the positional relationship between the left-side rear floor skirt 57 and the under cover 58. Specifically, an inner edge 57a on the vehicle-width-directionally inner side of the rear floor skirt 57 and a left edge 58v of the under cover 58 are spaced apart in the vehicle width direction. Air inside the body cover C is exhausted through a gap 283 formed between the inner edge 57a and the left edge 58v. The clearance of the gap 283 is CL3. A gap 283 having a clearance of CL3 is formed also between an inner edge on the vehicle-width-directionally inner side of the right-side rear floor skirt 57 (see FIG. 15) and a right edge of the under cover 58. Thus, the under cover 58 and the left and right rear floor skirts 57, 57 are not interconnected. The under cover 58 is fixed to the body frame F, while the rear floor skirts 57 are fixed to the body frame F and the step floors 68 (see FIG. 1). The step floors 68 are fixed to the left and right step frames 23L, 23R (reference sign 23L is shown in FIGS. 2, and 23R in FIG. 14).

The gaps 283 between the rear floor skirts 57 and the under cover 58 are opening in the vertical direction, and their clearance CL3 is small. Therefore, even if muddy water or the like is splashed from the road surface, the muddy water or the like would not easily enter the inside of the body cover. Also, the muddy water or the like can be prevented from entering the inside from lateral sides.

Figure 19:
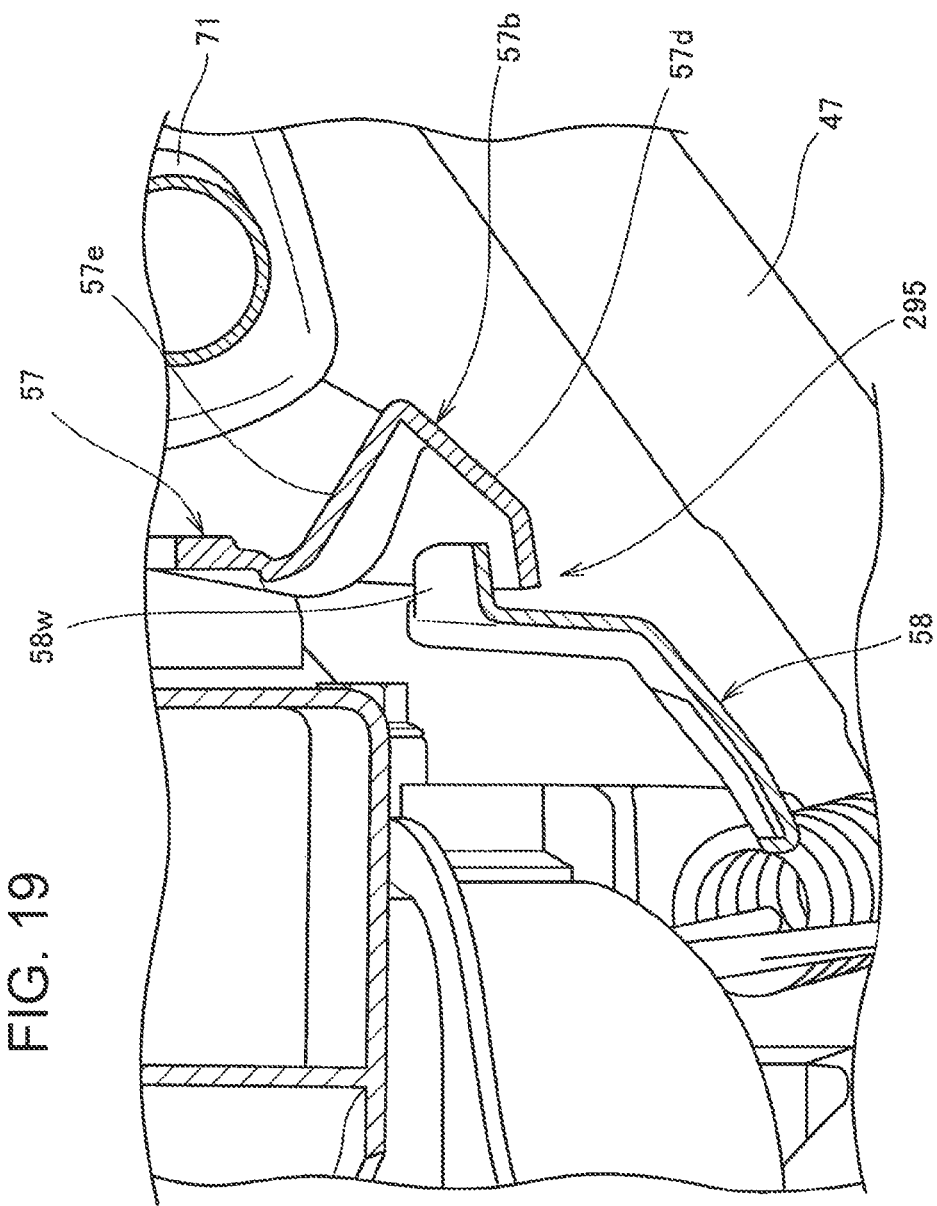
FIG. 19 is a sectional view taken along line XIX-XIX of FIG. 15.

FIG. 19 is a sectional view taken along line XIX-XIX of FIG. 15.

The barb rib 58w projecting sideways is formed at a rear end side part of the under cover 58. The rear floor skirt 57 is formed with a skirt recess part 57b (which is dogleg-shaped in section) so as to face the barb rib 58w on the vehicle-width-directionally outer side of the barb rib 58w. The barb rib 58w and the skirt recess part 57b form a cutwater labyrinth 295 for preventing muddy water or the like from entering the inside of the body cover. Specifically, the skirt recess part 57b includes a lower wall 57d having a lower edge located under the barb rib 58w, and an upper wall 57e extending from the upper edge of the lower wall 57d to the upper side of the barb rib 58w. The lower wall 57d, the barb rib 58w, and the upper wall 57e in this order from the lower side form a maze structure, namely, labyrinth. Therefore, muddy water or the like splashed from the road surface can be prevented from externally entering the inside of the rear floor skirt 57 and the under cover 58, without interconnecting the under cover 58 and the rear floor skirt 57. Besides, as shown in FIGS. 10(C) and 15, the cutwater labyrinth 295 is provided only in the areas where the barb ribs 58w and 58x of the under cover 58 are formed. This configuration is for reducing the influence of the muddy water or the like on accessories such as the air cleaner box 35 (see FIG. 1) disposed rearwardly of the under cover 58. Thus, the cutwater labyrinth 295 is provided at the gap between each side rear edge part of the under cover 58 and each rear floor skirt 57. This ensures that the exhaust air passing inside the body cover C can be exhausted, while effectively preventing intrusion of muddy water or the like.

Now, flows of air in the surroundings of the fuel tank 40 and the radiator 41 as above-mentioned will be described below.

Figure 20:
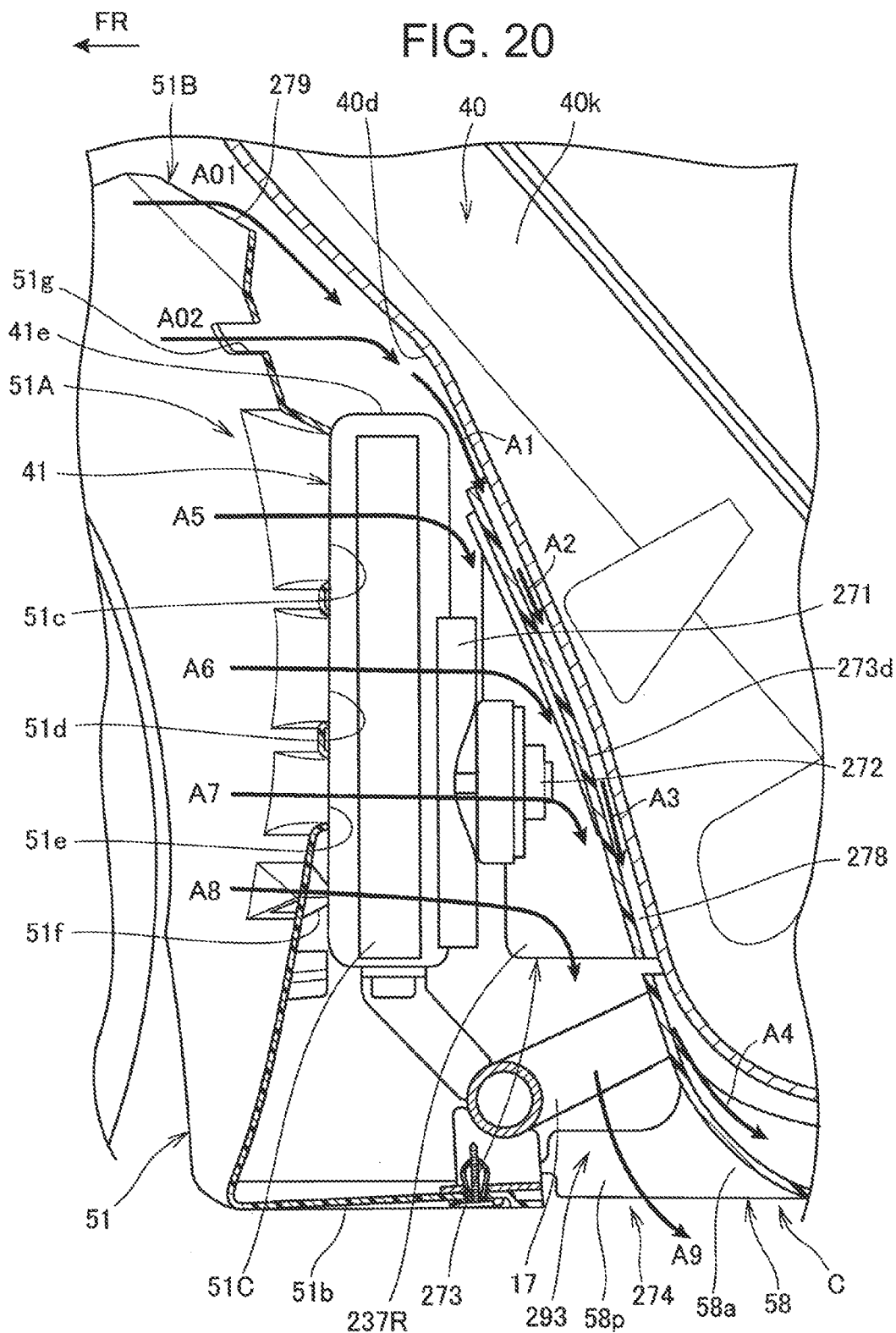
FIG. 20 is an operation diagram illustrating flows of air inside the body cover.

FIG. 20 is an operation diagram illustrating the flows of air inside the body cover.

Air flowing in from the vehicle body front side through the fuel tank opening section 51B, specifically, through the upper edge opening 279 and the upper opening 51g, to the rear side of the front lower cover 51 flows down from an upper front side of the front wall 40d along the front wall 40d, as indicated by arrows A01, A02, and A1. Further, the air flows down through a fresh air passage 278 formed between the front wall 40d and the intermediate wall 273d of the exhaust air guide 273, as indicated by arrows A2 and A3. Furthermore, as indicated by arrow A4, the air passes between a lower portion of the front wall 40d and the air guide wall 58a of the under cover 58, and flows rearward between the fuel tank 40 and the under cover 58.

In addition, as indicated by arrows A5 to A8, airflow passing from the vehicle body front side through the radiator opening section 51A of the front lower cover 51, specifically, through the first opening 51c, the second opening 51d, the third opening 51e, and the fourth openings 51f, 51f (only one reference sign 51f is shown) and flowing to the rear side of the front lower cover 51 passes across the core section 410 of the radiator 41 to the rear side of the radiator 41. Further, it passes downward along the front surface of the intermediate wall 273d of the exhaust air guide 273. Then, as indicated by arrow A9, the airflow passes through an exhaust air passage 293 formed forwardly of the air guide wall 58a, and goes out to the lower side of the under cover 58 via the exhaust opening 274, which is an outlet of the exhaust air passage 293.

As above-mentioned, in this embodiment, the fresh air and the radiator exhaust air are separated from each other to form two layers of flow, by utilizing the exhaust air guide 273 and the air guide wall 58a of the under cover 58, between the fuel tank 40 and the radiator 41. As a result, a thermal influence of the radiator exhaust air is prevented from being imposed on the fuel tank 40. Besides, the radiator exhaust air can be efficiently discharged, while arranging the fuel tank 40 and the radiator 41 proximate to each other.

The radiator 41 is disposed on the lower side of the fuel tank 40 having its front wall 40d inclined forward. Therefore, even though the exhaust air guide 273, the fan 271, and the electric motor 272 are disposed in the space (triangular in side view) between the fuel tank 40 and the radiator 41 while the space between the upper end of the radiator 41 and the front wall 40d is secured, it is possible to set the fuel tank 40 and the radiator 41 proximate to each other. Moreover, it is possible to form two layers of air passages, namely, the exhaust air passage 293 and the fresh air passage 278.

Figure 21:
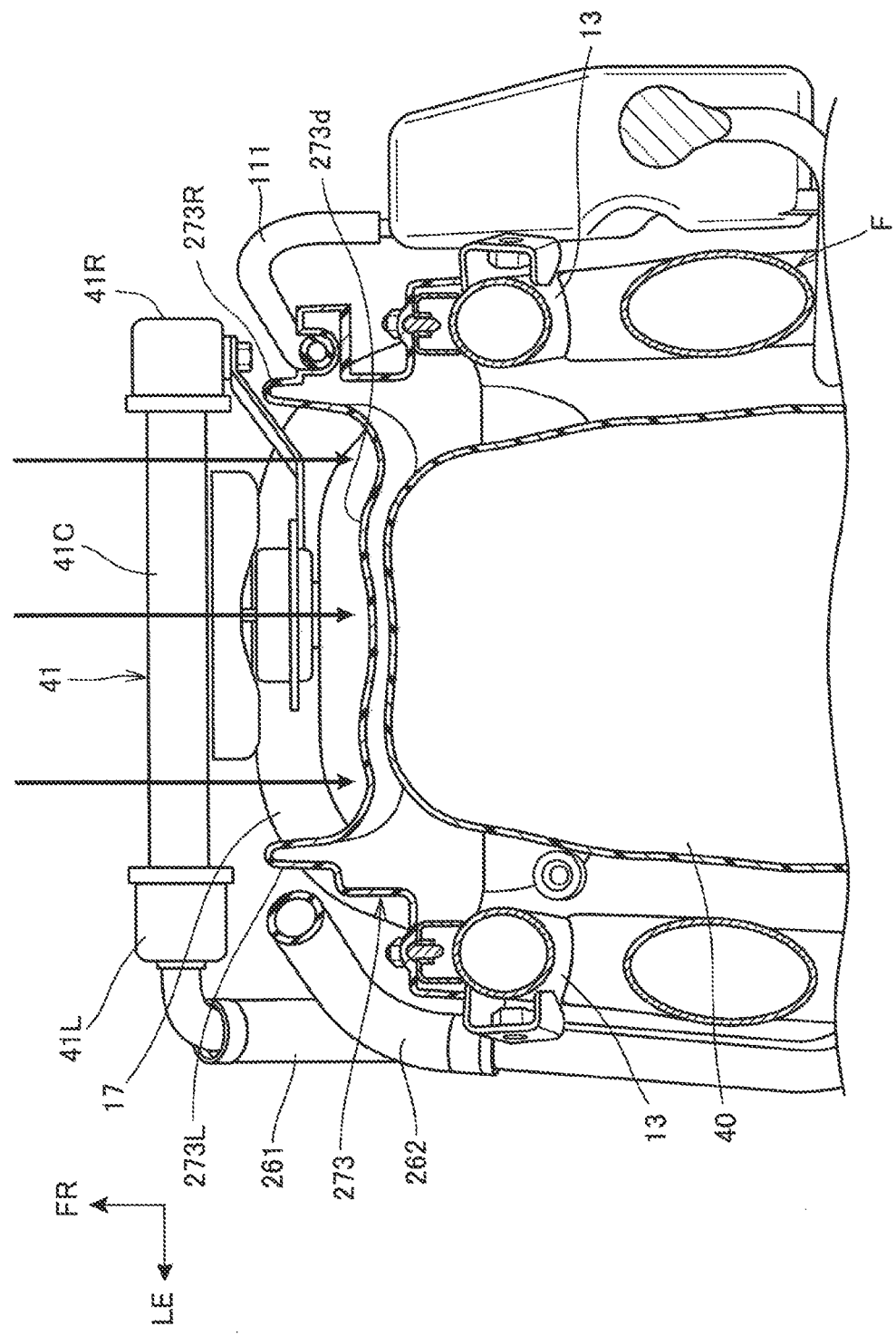
FIG. 21 is an operation diagram showing the flow of exhaust air from the radiator.

FIG. 21 is an operation diagram illustrating the flow of exhaust air from the radiator 41.

As indicated by arrows, airflow impinging on the radiator 41 from the vehicle front side passes across the radiator 41, to become exhaust air warmed by the radiator 41. The warm exhaust air is collected into the exhaust air passage 293 surrounded by the intermediate wall 273d and the left and right longitudinal wall parts 273L and 273R of the exhaust air guide 273 covering the front side of the fuel tank 40, and goes downward, to be discharged to the lower side of the body cover C. Therefore, the exhaust air from the radiator 41 is restrained from flowing out to the vehicle-width-directionally outer sides of the longitudinal wall parts 273L and 273R. Accordingly, thermal influence of the exhaust air on the fuel tank 40 can be reduced. In addition, the lower radiator hose 261 and the upper radiator hose 262 are disposed on the vehicle-width-directionally outer side of the longitudinal wall parts 273L and 273R. Therefore, the lower radiator hose 261 and the upper radiator hose 262 do not traverse the exhaust air passage 293. This permits the exhaust air to flow smoothly.

Figure 22:
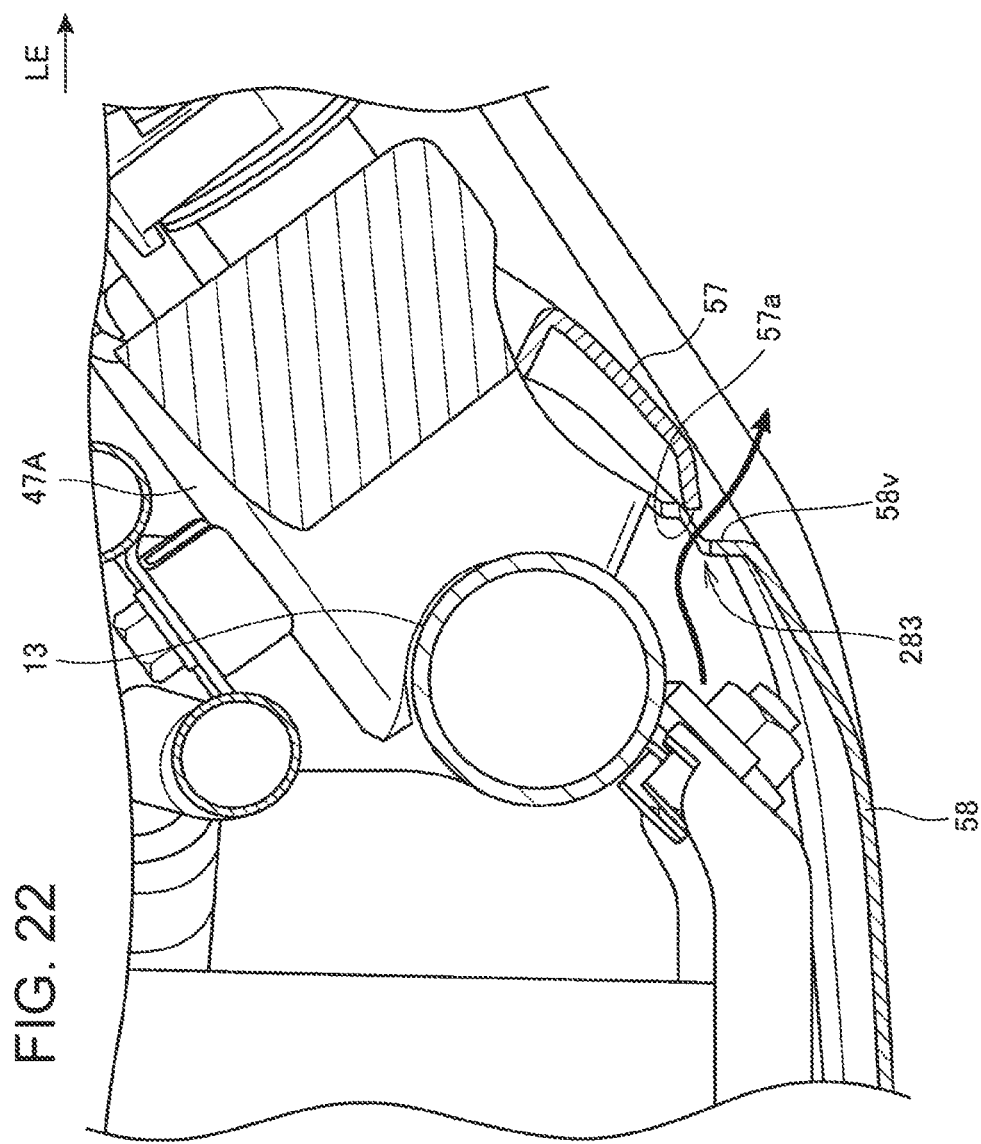
FIG. 22 is an operation diagram showing the flow of air in a lower portion of the body cover.

FIG. 22 is an operation diagram illustrating the flow of air inside a lower portion of the body cover C.

The air flowing rearward inside the body cover C, specifically, between the lower surface of the fuel tank 40 (see FIG. 19) and the under cover 58, is fresh air which has been mixed little with the exhaust air from the radiator 41 (see FIG. 19). As indicated by arrow, this fresh air is discharged to the exterior of the body cover C through the gaps 283 formed between the left edge 58v and the right edge (not shown) of the under cover 58 and the inner edges 57a of the rear floor skirts 57, 57 (only one reference sign 57 is shown). Each of the gaps 283 is opened in the vertical direction, and has a narrow clearance. Further, since the fresh air flows out through the gaps 283, muddy water or the like splashed from the front wheel 2 (see FIG. 1) is not liable to enter the gaps 283 from below.

Now, operation of the above-mentioned lift-up support part 297 will be described below.

Figure 23:
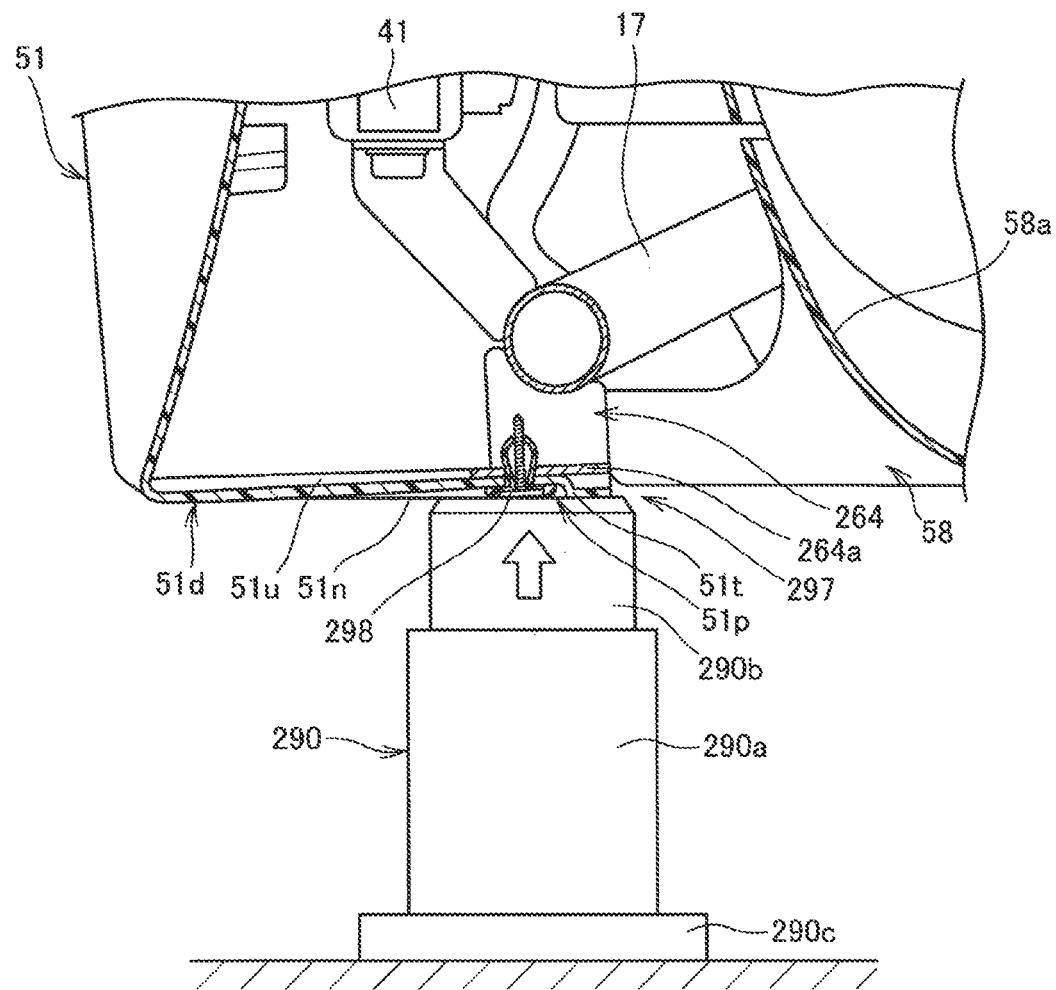
FIG. 23 is an operation diagram illustrating the operation of a lift-up support part of a front lower cover.

FIG. 23 is an operation diagram illustrating the operation of the lift-up support part 297 of the front lower cover 51.

In the case of lifting up a vehicle body front portion for maintenance or the like, a jack 290 is disposed under the lift-up part 51p provided at a front lower portion of the vehicle body. The jack 290 includes a cylinder section 290a, and a rod section 290b provided in the cylinder section 290a so that it can be moved up and down. By operating an operating section (not shown), the rod section 290b can be raised relative to the cylinder section 290a by a hydraulic pressure, pneumatic pressure or the like. Incidentally, reference sign 290c denotes a base section attached to the lower end of the cylinder section 290a. The base section 290c is placed on the ground.

By operating the operating section of the jack 290, the rod section 290b is raised, as indicated by void arrow, whereby the upper end of the rod section 290b is brought into contact with the lift-up part 51p of the vehicle body. Then, the rod section 290b is further raised, to lift up the vehicle body to a desired height position. In this instance, the weight of the vehicle body front portion acts on the lift-up support part 297. The weight can be supported by both the lower cross member stay 264 mounted to the front cross member 17 and the rearward extension section 51b of the front lower cover 51 attached to the lower cross member stay 264.

Figure 24:
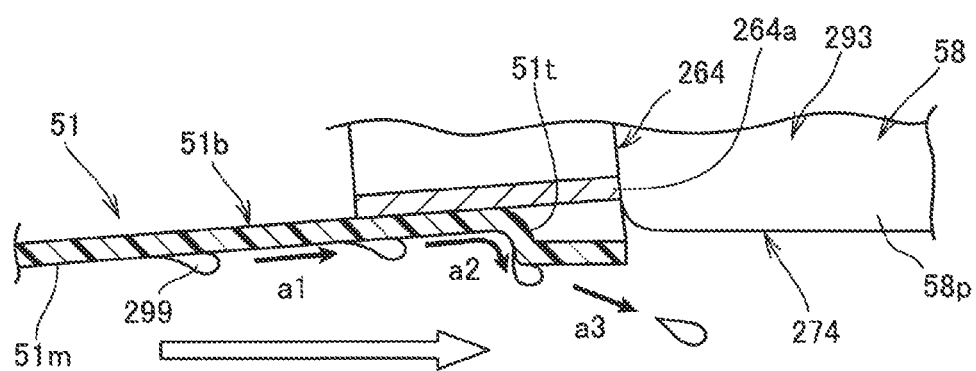
FIG. 24 is an operation diagram illustrating the operation of a stepped part in a rearward extension section of the front lower cover.

FIG. 24 is an operation diagram illustrating the operation of the stepped part 51t of the rearward extension section 51b of the front lower cover 51.

A water drop 299 splashed by the front wheel may adhere to the lower surface 51m of the rearward extension section 51b of the front lower cover 51. In such a case, airflow passing as indicated by void arrow causes the water drop 299 to move on the lower surface 51m toward the vehicle body rear side, as indicated by arrow a1. At the stepped part 51t, the water drop 299 moves down the surface of the stepped part 51t as indicated by arrow a2, and falls as indicated by arrow a3. Therefore, the water drop 299 can be prevented from moving upward through the exhaust opening 274, which is disposed rearwardly of the rear end of the rearward extension section 51b, to enter the inside of the body cover C.

As shown in FIGS. 1 and 6, a fuel tank 40 and radiator 41 layout structure is provided for the motorcycle 1 as a saddle type vehicle wherein the seat 10 is disposed rearwardly of the handlebar 25, the center tunnel 250 is provided under an area between the handlebar 25 and the seat 10, the left and right step floors 68, 68 (only reference sign 68 on the viewer's side is shown) for the driver's feet are disposed on the left and right sides of the center tunnel 250, and the fuel tank 40 and the radiator 41 located forwardly of the fuel tank 40 are disposed inside the center tunnel 250. In the layout structure, the front wall 40d of the fuel tank 40 is inclined forward so as to obliquely extend downwardly rearward from the upper end thereof. The radiator 41 is disposed on a rear and lower side of the front end 40h of the fuel tank 40.n addition, the radiator 41 is provided vertically or is forwardly inclined so that its lower end 41f is located rearwardly of its upper end 41e in side view. The forward inclination angle of the front wall 40d of the fuel tank 40 relative to the vertical is greater than the forward inclination angle of the radiator 41 relative to the vertical.

According to this configuration, the radiator 41 is disposed on the rear and lower side of the front end 40h of the fuel tank 40. Therefore, the fuel tank 40 and the radiator 41 can be disposed proximate to each other. Besides, a space for passage of exhaust air can be secured on the rear side of the radiator 41. This makes it possible to make the motorcycle 1 smaller in size and compact in the vehicle longitudinal direction, while securing an enhanced cooling efficiency of the radiator 41.

The forward inclination angle of the front wall 40d of the fuel tank 40 relative to the vertical is greater above the upper end position of the radiator 41 than below the upper end position. Therefore, the upper end 41e of the radiator 41 may be disposed proximate to the position where the forward inclination angle of the fuel tank 40 changes, while increasing the fuel tank capacity in an area above the upper end position of the radiator 41. This ensures that the fuel tank 40 and the radiator 41 can be disposed to be more proximate to each other, and the motorcycle 1 can be made smaller in size and compact in the vehicle longitudinal direction.

Besides, as shown in FIGS. 2 and 6, the head pipe 12 for turnably supporting the steering system 260 is provided at a front portion of the body frame F, and the upper end 40j of the fuel tank 40 is disposed above the lower end of the head pipe 12. This ensures that the fuel tank capacity can be secured by elongating the fuel tank 40 in an upward direction. Therefore, the radiator 41 can be disposed proximate to the fuel tank 40 while making the fuel tank 40 compact in the vehicle longitudinal direction. Consequently, the motorcycle 1 can be made further smaller in size and compact in its longitudinal direction.

As shown in FIGS. 2, 4 and 5, the body frame F has a configuration wherein the pair of left and right down tubes 13, 13 each include: the downward extension section 70 extending downwardly rearward from the head pipe 12; the first bent section 73 as a bent section which is bent rearward in the vicinity of a lower portion of the fuel tank 40; and the horizontal extension section 71 as a rearward extension section extending rearward from the first bent section 73. The front wall 40d of the fuel tank 40 is located forwardly of the downward extension sections 70 of the down tubes 13, 13, in side view. Therefore, the fuel tank 40 and the radiator 41 can be disposed on the more front side in the motorcycle 1. This enables effective utilization of the space on the rear side of the fuel tank 40.

In addition, the fuel tank 40 is supported by upper portions of the downward extension sections 70 of the down tubes 13, 13. Therefore, stays or the like for fixing the fuel tank 40 to the down tubes 13, 13 can be made shorter.

As shown in FIGS. 2, 3 and 5, the front cross member 17 as a lower cross member that interconnects the left and right first bent sections 73, 73 and extends so as to protrude forward relative to the down tubes 13, 13, is provided. Also, the front upper cross member 16 as an upper cross member interconnects the left and right downward extension sections 70, 70 on the upper side of the radiator 41 and extends so as to protrude forward relative to the down tubes 13, 13, is provided. The radiator 41 is fixed to the front cross member 17 and the front upper cross member 16. Therefore, the radiator 41 can be disposed forwardly of the down tubes 13, 13. This ensures that the vehicle as a whole can be made compact, by disposing the radiator 41 and the fuel tank 40 close to the front wheel 2.

Besides, the lower end 41f of the radiator 41 is disposed above the first bent sections 73. This makes it possible to arrange the radiator 41 at a higher position, and thereby to permit airflow to impinge on the radiator 41 without being affected by the front wheel 2 and the like disposed forwardly of the radiator 41. Consequently, cooling efficiency of the radiator 41 can be enhanced.

As shown in FIGS. 2, 5 and 17, a radiator hose layout structure is provided for the motorcycle 1 as a saddle type vehicle that includes: the radiator 41 disposed rearwardly of the front wheel 2; the fuel tank 40 disposed rearwardly of the radiator 41; the exhaust air guide 273 provided between the radiator 41 and the fuel tank 40 so as to guide the exhaust air from the radiator 41; the unit swing engine U as a water-cooled power unit arranged rearwardly of the fuel tank 40; and the lower radiator hose 261 and the upper radiator hose 262 as radiator hoses that are connected respectively to the radiator 41 and the unit swing engine U so as to circulate cooling water. In the radiator hose layout structure, the longitudinal wall parts 273L and 273R projecting forward are provided at vehicle-width-directionally end portions of the exhaust air guide 273. The front ends 273m and 273n of the longitudinal wall parts 273L and 273R are provided rearwardly of the radiator 41. Besides, the exhaust air passage 293 permitting the exhaust air from the radiator 41 to flow therethrough is provided between the longitudinal wall parts 273L and 273R. The lower radiator hose 261 and the upper radiator hose 262 are arranged on the vehicle-width-directionally outer side of the longitudinal wall parts 273L and 273R.

According to this configuration, the lower radiator hose 261 and the upper radiator hose 262 are not disposed inside the exhaust air passage 293. Therefore, the exhaust air from the radiator 41 can be let flow smoothly into the exhaust air passage 293, and cooling efficiency of the radiator 41 can be thereby enhanced.

In the related art, the radiator hoses are disposed inside an exhaust air guide. Therefore, the exhaust air guide must be detached at the time of assembly or maintenance of the radiator hoses. Thus, the layout structure in the related art has demanded much labor at the time of assembly or maintenance of the radiator hoses. In this embodiment, on the other hand, the cooling water tubings including the lower radiator hose 261 and the upper radiator hose 262, as well as the lower pipe 263A and the upper pipe 263B connected to the lower radiator hose 261 and the upper radiator hose 262, respectively, are concentrated on the vehicle-width-directionally outer and left side of the exhaust air guide 273. This makes it possible to enhance the assembleability and maintainability of the cooling water tubings.

The radiator 41 is provided, on vehicle-width-directionally left and right sides thereof, with the left tank section 41L and the right tank section 41R as tank sections. The core section 41C including a cooling water passage and cooling fins is provided between the left and right tank sections 41L and 41R. The vehicle-width-directionally outer end portions of the core section 41C are disposed on the vehicle-width-directionally outer sides relative to the longitudinal wall parts 273L and 273R in plan view. This ensures that the core section 41C, necessary for cooling, fronts on the area between the longitudinal wall parts 273L and 273R. Therefore, even with the lower radiator hose 261 and the upper radiator hose 262 arranged on the vehicle-width-directionally outer side relative to the longitudinal wall parts 273L and 273R, cooling efficiency of the radiator 41 can be prevented from being lowered. In addition, at the time of connecting the lower radiator hose 261 and the upper radiator hose 262 to the left tank section 41L, the longitudinal wall part 273L does not obstruct the operation, so that workability can be enhanced.

As shown in FIGS. 11 and 17, the lower radiator hose 261 and the upper radiator hose 262 are connected to the left tank section 41L on the vehicle-width-directionally one side. The water supply port 284 is provided on the upper side of the right tank section 41R on the vehicle-width-directionally other side. The reservoir tubing 111, as a reservoir tank hose for interconnecting the water supply port 284 and the reservoir tank 46 for reserving cooling water, is held by the hose holding part 273q. This hose holding part 273q is provided at a side end portion of the exhaust air guide 273 on the vehicle-width-directionally outer side of the longitudinal wall part 273R on the vehicle-width-directionally other side. Therefore, the lower radiator hose 261 and the upper radiator hose 262 as well as the reservoir tubing 111 can be arranged compactly, while being distributed respectively to both sides of the radiator 41. Besides, since the reservoir tubing 111 is held by the hose holding part 273q of the exhaust air guide 273, it is unnecessary to provide an especial hose holding part. Consequently, it is possible to reduce the number of component parts and the number of assembly steps, to reduce cost, and to enhance productivity.

In addition, since the longitudinal wall parts 273L and 273R are formed therein with the hollow parts (cavities) 273g and 273h, it is possible to enhance rigidity of the longitudinal wall parts 273L and 273R while lightening the longitudinal wall parts 273L and 273R. Consequently, the longitudinal wall parts 273L and 273R can be greatly elongated forward.

As shown in FIGS. 2, 13 and 17, the left and right down tubes 13, 13, which extend downward from the head pipe 12 turnably supporting the steering system 260 and constituting a front portion of the body frame F, are provided. Besides, the outer walls 273e and 273f, as both lateral end portions provided on the vehicle-width-directionally outer sides relative to the longitudinal wall parts 273L and 273R of the exhaust air guide 273, are fixed to the front surfaces of the down tubes 13, 13. Thus, the fixing parts for fixing the exhaust air guide 273 to the down tubes 13, 13 are not provided inside the exhaust air passage 293. This makes it possible to cause the exhaust air from the radiator 41 to flow smoothly into the exhaust air passage 293, and thereby to enhance cooling efficiency of the radiator 41. In addition, since the exhaust air guide 273 is fixed to the front surfaces of the down tubes 13, 13, the force exerted on the exhaust air guide 273 by the exhaust air can be efficiently transmitted to the down tubes 13, 13. Therefore, lightening of the exhaust air guide 273 can be contrived.

As shown in FIG. 7, in side view, the upper end 273c of the exhaust air guide 273 is provided below the upper end 41e of the radiator 41 and above the vertically central position of the radiator 41. Besides, the lower end 273a of the exhaust air guide 273 is provided above the lower end 41f of the radiator 41 and below the vertically central position of the radiator 41. Therefore, the exhaust air guide 273 is provided in a position where the exhaust air from the radiator 41 is concentrated. This makes it possible to define the exhaust air passage 293 by the exhaust air guide 273, while forming the exhaust air guide 273 in a smaller and compact form, thereby reducing cost and weight.

As shown in FIGS. 1, 2, 6, 12 and 20, an air guide structure is provided for the motorcycle 1 as a saddle type vehicle that includes: the head pipe 12 turnably supporting the steering system 260 and constituting a front portion of the body frame F; the seat 10 disposed rearwardly of the head pipe 12; the center tunnel 250 provided between the head pipe 12 and the seat 10; the step floors 68 provided on the left and right sides of the center tunnel 250; the fuel tank 40 disposed inside the center tunnel 250; and the radiator 41 disposed forwardly of the fuel tank 40 inside the center tunnel 250.n the air guide structure, the fuel tank 40 is formed with the tank extension section 40k extending upward to above the upper end 41 of the radiator 41. The front wall 40d of the tank extension section 40k is forwardly inclined to extend rearwardly downward. The front lower cover 51 is disposed forwardly of the radiator 41 and rearwardly of the front wheel 2. The front lower cover 51 is provided with the radiator opening section 51A for guiding airflow to the radiator 41, and the fuel tank opening section 51B for guiding the airflow to the fuel tank 40 inclusive of the tank extension section 40k.

According to this configuration, the front lower cover 51 is provided with the fuel tank opening section 51B, separately from the radiator opening section 51A. This ensures that by introducing airflow via the fuel tank opening section 51B to the fuel tank 40, fresh air other than the radiator exhaust air can be guided to an area between the radiator 41 and the fuel tank 40, through utilization of the front wall 40d of the tank extension section 40k. Therefore, the influence of the exhaust air from the radiator 41 on the fuel tank 40 can be reduced effectively.

As shown in FIGS. 6 and 7, between the fuel tank 40 and the radiator 41, the exhaust air guide 273 as a heat insulating guide is provided that covers a part of the front wall 40d of the fuel tank 40 so as to prevent the exhaust air from the radiator 41 from thermally influencing the fuel tank 40. Between the exhaust air guide 273 and the fuel tank 40, the predetermined clearance CL1 is provided over the range from the upper end 273c to the lower end 273a of the exhaust air guide 273. Thus, instead of simply covering the front wall 40d of the fuel tank 40, the predetermined clearance CL1 is provided between the exhaust air guide 273 and the fuel tank 40. This ensures that airflow introduced by way of the front lower cover 51 is guided to the area between the exhaust air guide 273 and the fuel tank 40. As a result, a heat-insulating effect can be enhanced, and thermal influence on the fuel tank 40 can be further reduced.

The upper end 273c of the exhaust air guide 273 is disposed below the upper end 41e of the radiator 41 and above the vertically central position of the radiator 41. If, for example, the exhaust air guide 273 is disposed above the upper end 41e of the radiator 41, the clearance between the radiator 41 and the fuel tank 40 must be enlarged, since the front wall 40d of the fuel tank 40 is inclined forward. In contrast, when the upper end of the exhaust air guide 273 is disposed below the upper end 41e of the radiator 41, the spacing between the radiator 41 and the fuel tank 40 can be made smaller. This ensures that the vehicle can be made compact in the vehicle longitudinal direction.

In addition, since the upper end 273c of the exhaust air guide 273 is disposed below the upper end 41e of the radiator 41, the exhaust air from the radiator 41 may be considered to flow from the upper end 41e of the exhaust air guide 273 into the gap between the exhaust air guide 273 and the fuel tank 40. In this embodiment, however, the upper end 273c of the exhaust air guide 273 is provided above the vertically central position of the radiator 41. Therefore, the fresh air (other than the exhaust air from the radiator 41) introduced via the gap between the upper end 41e of the radiator 41 and the fuel tank 40 ensures that the exhaust air from the radiator 41 can be restrained from flowing via the upper end 273c of the exhaust air guide 273 into the gap between the exhaust air guide 273 and the fuel tank 40. Consequently, it is possible to minimize the influence of the exhaust air from the radiator 41 on the fuel tank 40.

Further, with the upper end 273c of the exhaust air guide 273 disposed below the upper end 41e of the radiator 41, it is possible to reduce the clearance between the upper end 41e of the radiator 41 and the fuel tank 40. This contributes to making the vehicle compact. In addition, this configuration makes it possible to enhance the flow velocity of the fresh air passing through the clearance between the upper end 41e of the radiator 41 and the fuel tank 40. Therefore, it is made easier to guide the fresh air into the clearance CL1 between the exhaust air guide 273 and the fuel tank 40.

As shown in FIGS. 9, 17 and 21, the exhaust air guide 273 is provided, on vehicle-width-directionally both sides thereof, with the left and right longitudinal wall parts 273L and 273R as longitudinal fin parts projecting forward. As a result of this, the exhaust air from the radiator 41 is restrained from flowing to the vehicle-width-directionally outer sides relative to the longitudinal wall parts 273L and 273R. Therefore, the exhaust air from the radiator 41 can be collected to the vehicle-width-directionally inner side of the longitudinal wall parts 273L and 273R. As a result, the thermal influence of the exhaust air from the radiator 41 on the fuel tank 40 can be suppressed more effectively.

In addition, as shown in FIGS. 6 and 8, the lower side of the fuel tank 40 is covered with the under cover 58. The under cover 58 is provided with the air guide wall 58a extending toward the radiator 41 side. The upper end 58b of the air guide wall 58a and the lower end 273a of the exhaust air guide 273 are disposed proximate to each other in the vertical direction. Therefore, a radiator exhaust air passage (exhaust air passage 293) with a large area can be defined by the air guide wall 58a and the exhaust air guide 273, while restraining water and the like from intruding through the gap between the air guide wall 58a and the exhaust air guide 273. The air guide wall 58a and the exhaust air guide 273 cooperate with each other to ensure that the exhaust air from the radiator 41 can be made to flow from the rear side of the radiator 41 along the respective front surfaces 273b and 58c of the exhaust air guide 273 and the air guide wall 58a, to be discharged to the lower side of the under cover 58. Besides, the back surfaces of the exhaust air guide 273 and the air guide wall 58a, the fresh air can be made to flow to the side of the lower surface of the fuel tank 40. Thus, introduced air can be distributed into front and rear two layers of flow, with the exhaust air guide 273 and the air guide wall 58a as a boundary. The one-side layer of flow contributes to discharge of the exhaust air coming from the radiator 41, whereas the other-side layer of flow contributes to heat insulation by the fresh air. Both of these functions make it possible to reduce the thermal influence on the fuel tank 40 more effectively.

As shown in FIGS. 15, 18 and 22, the rear floor skirts 57, 57 as under side covers are provided on the vehicle-width-directionally both sides of the under cover 58. The outside ends (the left edge 58v and the right edge (not shown) as vehicle-width-directional outer edges) of the under cover 58 and the inside ends (the inner edges 57a as vehicle-width-directionally inner edges) of the rear floor skirts 57 are spaced from each other. Therefore, the fresh air guided by the air guide wall 58a into the gap between the under cover 58 and the lower surface of the fuel tank 40 can be discharged via the gaps between the under cover 58 and the rear floor skirts 57, whereby a flow rate of the fresh air can be secured. Consequently, thermal influence on the fuel tank 40 can be reduced further effectively.

In addition, as shown in FIGS. 10(A) to 10(C) and 19, the outside ends (specifically, the barb ribs 58w, 58x) of the under cover 58 and the inside ends (specifically, the lower walls 57d) of the rear floor skirts 57 are so disposed as to overlap with each other in the vertical direction. Therefore, it is possible to reduce the possibility of a situation in which water or the like splashed by the front wheel 2 (see FIG. 1) might enter the inside of the under cover 58 and the rear floor skirts 57 from below the vehicle body, since the outside ends of the under cover 58 and the inside ends of the rear floor skirts 57 are vertically spaced from each other.

As shown in FIGS. 1, 2, 5 and 7, a radiator exhaust structure is provided for the motorcycle 1 as a saddle type vehicle that includes: a head pipe 12 turnably supporting the steering system 260 and constituting a front portion of the body frame F; the seat 10 disposed rearwardly of the head pipe 12; the center tunnel 250 provided under an area between the head pipe 12 and the seat 10; the step floors 68 provided on the left and right sides of the center tunnel 250; the radiator 41 disposed in the center tunnel 250; the exhaust air guide 273 provided rearwardly of the radiator 41 to guide the exhaust air from the radiator 41; and the under cover 58 by which the vehicle is covered on the lower side thereof. In the radiator exhaust structure, the air guide wall 58a constituting the front end of the under cover 58 and extending forwardly upward is disposed rearwardly of the radiator 41. Beside, the upper end 58b of the air guide wall 58a and the lower end 273a of the exhaust air guide 273 are disposed proximate to each other in the vertical direction.

According to this configuration, the upper end 58b of the air guide wall 58a and the lower end 273a of the exhaust air guide 273 are disposed proximate to each other. This ensures that the exhaust air passage 293 with a large area can be defined by the air guide wall 58a and the exhaust air guide 273, while restraining water and the like from intruding via the gap between the air guide wall 58a and the exhaust air guide 273. The air guide wall 58a and the exhaust air guide 273 cooperate with each other to cause the exhaust air from the radiator 41 to flow down from the rear side of the radiator 41 along the exhaust air guide 273 and the air guide wall 58a, to be efficiently discharged to the lower side of the under cover 58. Consequently, cooling efficiency of the radiator 41 can be enhanced.

As shown in FIGS. 8 and 10, the predetermined clearance CL2 is formed between the upper end 58b of the air guide wall 58a and the lower end 273a of the exhaust air guide 273. On the vehicle-width-directionally both end sides of the air guide wall 58a at the front end of the under cover 58, forward extension sections 58p, 58p are formed as left and right extension sections extending forward. In addition, the connection wall 58q interconnecting the forward extension sections 58p, 58p and the air guide wall 58a is formed. The air guide wall 58a and the exhaust air guide 273 are formed proximate to each other, with the predetermined clearance CL2 therebetween, so that they are not interconnected. Therefore, a step for assembling the air guide wall 58a and the exhaust air guide 273 together inside the body cover C can be abolished, and productivity can be enhanced thereby. Besides, the rigidity of the air guide wall 58a can be secured by the connection wall 58q connected to the forward extension sections 58p, 58p, without interconnecting the air guide wall 58a and the exhaust air guide 273.

In addition, the ribs 58j and 58k extending in the vehicle longitudinal direction are provided at the upper surface of the air guide wall 58a. As a result, the rigidity of the air guide wall 58a can be further enhanced by the ribs 58j and 58k.

As shown in FIGS. 2, 5 and 16, the radiator 41 is disposed forwardly of the down tubes 13, 13 provided as the left and right frame members obliquely extending downwardly rearward from the head pipe 12. The front cross member 17 is provided as a cross member by which the down tubes 13, 13 as left and right frame members are interconnected below the radiator 41 and above the forward extension sections 58p, 58p and that extends so as to project forward. The front cross member 17 overlaps with the forward extension sections 58p, 58p in plan view. This ensures that the exhaust air from the radiator 41 can be restrained by the front cross member 17 from impinging directly on the forward extension sections 58p, 58p. Therefore, it is possible to reduce rigidity of the forward extension sections 58p, 58p themselves and thereby to lighten the under cover 58. Further, since the exhaust air does not impinge on the forward extension sections 58p, 58p, disturbance of the flow of the exhaust air can be restrained.

In addition, as shown in FIGS. 5 and 13, the front cross member 17 is provided with the lower cross member side brackets 265, 265 as fixing parts for fixing the forward extension sections 58p, 58p. Therefore, the under cover 58 is fixed by the forward extension sections 58p, 58p, which are close to the air guide wall 58a, whereby rigidity of the air guide wall 58a can be enhanced.

As shown in FIGS. 6 and 16, the exhaust opening 274 so opened as to permit the exhaust air from the radiator 41 to flow therethrough to the lower side of the under cover 58 is provided on the front side of the air guide wall 58a and between the left and right forward extension sections 58p, 58p. Therefore, the exhaust air from the radiator 41 is effected through the exhaust opening 274 defined by the front end of the under cover 58. This ensures that an exhaust space with a large area can be formed in a concentrated manner, without being dispersed. Consequently, cooling efficiency of the radiator 41 can be enhanced.

In addition, as shown in FIG. 8, the upper end 58b of the front surface 58c of the air guide wall 58a is disposed rearwardly of the lower end 273a of the front surface 273b of the exhaust air guide 273. Therefore, in the case where the predetermined clearance CL2 in the vertical direction is provided between the upper end 58b of the air guide wall 58a and the lower end 273a of the exhaust air guide 273, it is possible, by disposing the upper end 58b of the front surface 58c of the air guide wall 58a rearwardly of the lower end 273a of the front surface 273b of the exhaust air guide 273, to cause the exhaust air to effectively flow downward along the front surface 58c of the air guide wall 58a, while restraining the exhaust air from entering the inside of the air guide wall 58a via the clearance CL2.

As shown in FIGS. 6 and 7, the fuel tank 40 is provided rearwardly of the exhaust air guide 273, and the front wall 40d of the fuel tank 40 is obliquely inclined rearwardly downward. The exhaust air guide 273 is curved to be protuberant rearward in side view, and the lower end 273a of the exhaust air guide 273 is disposed above the lower end 41f of the radiator 41. The air guide wall 58a is curved to be protuberant forward, and the upper end 58b of the air guide wall 58a is disposed below the lower end 41f of the radiator 41. Therefore, with the exhaust air guide 273 curved to be protuberant rearward, it is ensured that even though the radiator 41 is disposed forwardly of the fuel tank 40, the exhaust air can be efficiently guided downward, while forming a larger exhaust air space by the exhaust air guide 273. The exhaust air guided downward from the radiator 41 can be discharged rearward with a large area while utilizing the space under the fuel tank 40, by the air guide wall 58a curved to be protuberant forward.

As shown in FIGS. 2, 3, 5, 8 and 23, a lift-up support part structure is provided for the motorcycle 1 as a saddle type vehicle wherein the left and right down tubes 13, 13 obliquely extend downwardly rearward from the head pipe 12 turnably supporting the steering system 260; respective front lower portions of the down tubes 13, 13 are interconnected as a left-right pair by the front cross member 17 provided as a cross member; the front lower cover 51 as a body cover is disposed at least under the front cross member 17; and the lift-up part 51p to which a lifting-up device such as the jack 290 is to be applied at the time of lifting up the vehicle body is provided at a vehicle body lower portion. The lift-up support part structure includes: the lower cross member stay 264 as a stay fixed to the front cross member 17 so as to form at least a bottom surface along the surface of the front lower cover 51; the body cover fixing part 51r for fixing the front lower cover 51 to the bottom surface of the lower cross member stay 264; and the lift-up part 51p provided at the body cover fixing part 51r.

According to the just-mentioned configuration, the lower cross member stay 264 for fixing the front lower cover 51 to the front cross member 17 is provided. This makes it possible to maintain the mutual positional relationship between the front cross member 17 and the front lower cover 51. Besides, the part for securing the strength and rigidity on the front lower cover 51 side can be minimized near the lower cross member stay 264, and the weight of the front lower cover 51 can be restrained from being increased.

As shown in FIGS. 2 and 8, the body cover includes the front lower cover 51 disposed rearwardly of the front wheel 2. The front lower cover 51 has the rearward extension section 51b as a lower surface section of which the lower end extends to the lower side of the front cross member 17 on the rear side. The rearward extension section 51b has a rear end located rearwardly of the lift-up part 51p. Therefore, the position of the lift-up part 51p can be easily confirmed by the operator. Besides, the body cover fixing part 51r can be provided at an end portion of the rearward extension section 51b, so that the front lower cover 51 can be firmly fixed. In addition, since thickening of the front lower cover 51 and the like are unnecessitated, lightening of the front lower cover 51 can be promised. Besides, even when the front lower cover 51 is thinned and lightened, the presence of the body cover fixing part 51r makes it possible to maintain the shape of the front lower cover 51.

As shown in FIGS. 8, 15 and 24, the exhaust opening 274 as an opening through which the space above the rearward extension section 51b and the space below the rearward extension section 51b communicate with each other is provided rearwardly of the rear end of the rearward extension section 51b. In addition, the stepped part 51t formed in a crank-like shape with an offset to the lower side is provided at a rear end portion of the rearward extension section 51b, and the stepped part 51t extends in the vehicle width direction. With the crank-shaped stepped part 51t thus provided, the rigidity of the front lower cover 51 can be enhanced over the vehicle width direction. Besides, when water drop or the like adheres to the surface of the rearward extension section 51b of the front lower cover 51 and the water drop or the like flows rearward on the surface of the rearward extension section 51b, the water drop or the like can be dropped by the stepped part 51t. This ensures that even through the exhaust opening 274 is provided rearwardly of the front lower cover 51, the water drop and the like can be prevented from entering the inside of the body cover C, inclusive of the front lower cover 51, via the exhaust opening 274.

As shown in FIG. 8, the upper surface 51q and the lower surface 51m of the rearward extension section 51b are formed respectively with the upper ribs 51u and the lower ribs 51n as pluralities of ribs extending in the vehicle longitudinal direction. The upper ribs 51u and the lower ribs 51n are connected to the stepped part 51t. Therefore, the rigidity of the lift-up part 51p can be enhanced by the stepped part 51t as well as the upper ribs 51u and the lower ribs 51n. For a certain level of rigidity, the lift-up part 51p can be reduced in weight as compared with a structure wherein the lift-up part 51p is increased in material thickness so as to enhance rigidity.

Besides, the body cover fixing part 51r is fixed from the lower side of the front lower cover 51 by the fastening member 293 or the engagement member, and the fastening member 298 or the engagement member is disposed forwardly of the stepped part 51t. This ensures that even where the fastening member 298 or the engagement member is assembled from the lower side of the front lower cover 51, the head part 298a of the fastening member 298 or the engagement member can be prevented by the stepped part 51t from projecting to the lower side of the body cover fixing part 51r. Consequently, contact between the lifting-up device and the head part 298a can be restrained.

As shown in FIGS. 8 and 23, the rearward extension section 51b is so inclined that it is located at an upper position as one goes rearward, on the front side of the stepped part 51t. This ensures that at the time of lifting up a vehicle front portion, the vehicle front portion is lifted up in such a manner that the rearward extension section 51b approaches a horizontal state. At the time of lifting, therefore, the weight can be efficiently transmitted to the lifting-up device. Besides, the lower ribs 51n formed at the lower surface 51m of the rearward extension section 51b can be formed to be increased in vertical thickness toward the rearward direction. This leads to a further enhancement of the rigidity of the lift-up part 51p.

The above-described embodiment is merely one mode for carrying out the present invention, and arbitrary modifications and applications are possible within the scope of the gist of the invention.

The saddle type vehicle to which the present invention is to be applied includes not only motorcycles (inclusive of motorbikes) but also three-wheel vehicles and four-wheel vehicles which are classified as ATVs (all terrain vehicles).

DESCRIPTION OF REFERENCE SYMBOLS

1 Motorcycle (Saddle type vehicle)
2 Front wheel

10 Seat
12 Head pipe
40 Fuel tank
40d Front wall of fuel tank
40k Tank extension section
41 Radiator
41e Upper end of radiator
51 Front lower cover
51A Radiator opening section
51B Fuel tank opening section
57 Rear flower skirt (Under side cover)
58 Under cover
58a Air guide wall
58b Upper end of air guide wall
68 Step floor
250 Center tunnel
260 Steering system
273 Exhaust air guide (Heat insulation guide)
273a Lower end of exhaust air guide
273c Upper end of exhaust air guide
273L, 273R Longitudinal wall part (Longitudinal fin part)
F Body frame

What is claimed is:

1. An air guide structure for a saddle type vehicle including a head pipe turnably supporting a steering system and constituting a front portion of a body frame, a seat disposed rearwardly of the head pipe, a center tunnel provided between the head pipe and the seat, step floors provided on the left and right sides of the center tunnel, a fuel tank disposed in the center tunnel, and a radiator disposed forwardly of the fuel tank in the center tunnel, wherein the fuel tank is provided with a tank extension section that extends to above an upper end of the radiator, a front wall of the tank extension section is inclined forward by obliquely extending rearwardly downward, a front lower cover is disposed forwardly of the radiator and rearwardly of a front wheel, and the front lower cover is provided with a radiator opening section for guiding airflow to the radiator and with a fuel tank opening section for guiding the airflow to the fuel tank inclusive of the tank extension section.

2. The air guide structure according to claim 1, wherein a heat insulation guide that covers a part of the front wall of the fuel tank to avoid thermal influence of the exhaust air from the radiator is provided between the fuel tank and the radiator, and a predetermined clearance is provided between the heat insulation guide and the fuel tank over a range from an upper end to a lower end of the heat insulation guide.

3. The air guide structure according to claim 2, wherein the upper end of the heat insulation guide is disposed below the upper end of the radiator and above a vertical-directionally central position of the radiator.

4. The air guide structure according to claim 2, wherein the heat insulation guide is provided with longitudinal fin parts projecting forward, on vehicle-width-directionally both sides, so as to restrain exhaust air from the radiator from flowing to vehicle-width-directionally outer sides of the longitudinal fin parts.

5. The air guide structure according to claim 1, wherein the fuel tank is covered with an under cover on the lower side thereof, the under cover is provided with an air guide wall extending toward the radiator side, and an upper end of the air guide wall and a lower end of the heat insulation guide are disposed proximate to each other in the vertical direction.

6. The air guide structure according to claim 5, wherein the upper end of the air guide wall and the lower end of the heat insulation guide is disposed with a predetermined clearance therebetween.

7. The air guide structure according to claim 5, wherein under side covers are provided on vehicle-width-directionally both sides of the under cover, and the outside ends of the under cover and the inside ends of the under side covers are disposed separate from each other.

8. The air guide structure according to claim 7, wherein the outside ends of the under cover and the inside ends of the under side covers are so disposed as to overlap with each other in plan view.

9. The air guide structure according to claim 3, wherein the heat insulation guide is provided with longitudinal fin parts projecting forward, on vehicle-width-directionally both sides, so as to restrain exhaust air from the radiator from flowing to vehicle-width-directionally outer sides of the longitudinal fin parts.

10. The air guide structure according to claim 2, wherein the fuel tank is covered with an under cover on the lower side thereof, the under cover is provided with an air guide wall extending toward the radiator side, and an upper end of the air guide wall and a lower end of the heat insulation guide are disposed proximate to each other in the vertical direction.

11. The air guide structure according to claim 10, wherein the upper end of the air guide wall and the lower end of the heat insulation guide is disposed with a predetermined clearance therebetween.

12. The air guide structure according to claim 3, wherein the fuel tank is covered with an under cover on the lower side thereof, the under cover is provided with an air guide wall extending toward the radiator side, and an upper end of the air guide wall and a lower end of the heat insulation guide are disposed proximate to each other in the vertical direction.

13. The air guide structure according to claim 12, wherein the upper end of the air guide wall and the lower end of the heat insulation guide is disposed with a predetermined clearance therebetween.

14. The air guide structure according to claim 4, wherein the fuel tank is covered with an under cover on the lower side thereof, the under cover is provided with an air guide wall extending toward the radiator side, and an upper end of the air guide wall and a lower end of the heat insulation guide are disposed proximate to each other in the vertical direction.

15. The air guide structure according to claim 14, wherein the upper end of the air guide wall and the lower end of the heat insulation guide is disposed with a predetermined clearance therebetween.

16. The air guide structure according to claim 6, wherein under side covers are provided on vehicle-width-directionally both sides of the under cover, and the outside ends of the under cover and the inside ends of the under side covers are disposed separate from each other.

17. The air guide structure according to claim 16, wherein the outside ends of the under cover and the inside ends of the under side covers are so disposed as to overlap with each other in plan view.

* * * * *